US012810749B2

(12) United States Patent
Gasz

(10) Patent No.: US 12,810,749 B2
(45) Date of Patent: Nov. 24, 2026

(54) SYSTEMS AND METHODS FOR SURGICAL TRAINING

(71) Applicant: Balazs Zoltan Gasz, Pecs (HU)

(72) Inventor: Balazs Zoltan Gasz, Pecs (HU)

( * ) Notice: Subject to any disclaimer, the term of this patent is extended or adjusted under 35 U.S.C. 154(b) by 292 days.

(21) Appl. No.: 18/440,169

(22) Filed: Feb. 13, 2024

(65) Prior Publication Data

US 2024/0274038 A1 Aug. 15, 2024

Related U.S. Application Data

(60) Provisional application No. 63/484,637, filed on Feb. 13, 2023.

(51) Int. Cl.
*G09B 23/30* (2006.01)
*G09B 23/34* (2006.01)

(52) U.S. Cl.
CPC ........... *G09B 23/303* (2013.01); *G09B 23/34* (2013.01)

(58) Field of Classification Search
CPC ....... G09B 23/28; G09B 23/30; G09B 23/303
See application file for complete search history.

(56) References Cited

U.S. PATENT DOCUMENTS

| | | | | |
|---|---|---|---|---|
| 5,947,743 | A * | 9/1999 | Hasson | G09B 23/286 434/262 |
| 6,517,354 | B1 * | 2/2003 | Levy | G09B 23/28 434/262 |
| 8,899,989 | B2 * | 12/2014 | Mourton | G09B 23/285 434/272 |
| 10,360,813 | B2 * | 7/2019 | Okayama | F04B 53/16 |
| 11,682,320 | B2 * | 6/2023 | Sadasivan | G09B 23/303 434/268 |
| 11,830,377 | B2 * | 11/2023 | Hutmacher | G09B 23/30 |
| 11,926,047 | B2 * | 3/2024 | Cambronero | B25J 9/02 |
| 12,475,811 | B2 * | 11/2025 | Spallek | G09B 23/303 |
| 2017/0103682 | A1 * | 4/2017 | Okayama | G06T 7/0012 |
| 2019/0035307 | A1 * | 1/2019 | Mourton | G09B 23/285 |
| 2024/0021104 | A1 * | 1/2024 | Okayama | G09B 23/34 |
| 2025/0037612 | A1 * | 1/2025 | Gerke | G09B 23/285 |

* cited by examiner

*Primary Examiner* — Kurt Fernstrom
(74) *Attorney, Agent, or Firm* — BCF LLP

(57) ABSTRACT

Systems and methods for surgical suture training for various anatomical scenarios are provided. The system is modular and comprises one or more of: vessel model, a vessel holder, a positioner, an instrument, a 3D base, and a vessel connector. The methods include methods of producing the vessel model, methods of testing integrity thereof, and methods of reproducing various anatomical scenarios using one or more vessel models.

20 Claims, 25 Drawing Sheets

SYSTEMS AND METHODS FOR SURGICAL TRAINING

CROSS-REFERENCE TO RELATED APPLICATIONS

The present application claims the benefit of U.S. Provisional Application 63/484,637 filed on Feb. 13, 2023 which is incorporated herein by reference in its entirety.

TECHNICAL FIELD

The present technology relates to systems and methods for surgical training.

BACKGROUND

Surgical skills are essential for all surgeons and are required in a diverse range of medical conditions as well as on different parts of the anatomy. Surgical training is often provided on cadavers or animals. One of the numerous disadvantages with such existing surgical training is the limited resources (cadavers and animals) on which surgical training can be performed as well as the strict conditions under which the cadavers and the animals must be kept. In certain anatomical scenarios, integrity of surgical suturing can be a matter of life or death for the patient. Therefore, there is a need for surgical training systems that can overcome or minimise the disadvantages outlined above and allow for assessment of the effectiveness of a surgical skill.

SUMMARY

It is an object of the present technology to provide systems and methods related to surgical training, using for example, anatomical models.

Developers have noted that there is a need for practicing surgical suturing under different conditions: suturing of vessels with fatty tissue near or around the vessel, suturing of vessels in different anatomical settings, suturing different types of vessels (arterial, venous), suturing different sizes of vessels, suturing vessels at different relative orientations. In the case of graft suturing practice, it is important to practice suturing two vessels together at different respective angles. Training under a variety of conditions and scenarios, ranging from the relatively straightforward to the more complex, enables a medical practitioner to develop their skills.

According to certain aspects, Developers have developed a kit for surgical suturing training in which suturing can be practiced and assessed. Developers have also developed 3D bases which mimic certain anatomical scenarios, vessel model holders which can be attached to the 3D bases, vessel models which can be attached to the vessel model holders and can be sutured together, fatty vessel models which mimic blood vessels with fatty deposits thereon, vessel model connectors for connecting vessel models to the 3D base, and positioners for positioning in a plurality of different relative positions, a graft vessel model with respect to a host vessel model.

Aspects and embodiments of the present technology are defined below and in the appended claims.

Broadly, there is provided a modular kit for recreating different anatomical scenarios in which surgical tasks and skills can be practised. Inconveniences of using cadavers and animals for surgical training is avoided. The modular kit includes one or more of: a vessel model which simulates an at least partially hollow body part on which surgery is to be practised, a 3D base to which the vessel model can be detachably attached, connector mechanisms for connecting the vessel model to the 3D base and/or for testing an integrity of the surgery after the surgery has been performed on the vessel model, and surgical instruments. Other vessel models can then be subsequently attached to the 3D base. The vessel models may simulate blood vessels or any other hollow anatomical part such as bladder, lymph, stomach, bowel. Advantageously, in some embodiments, the surgical skill performed on the vessel model can be quantitatively assessed such as by determining is the vessel model has any leaks. This is an improvement over prior art methods which have qualitative feedback only.

From one aspect, there is provided a vessel holder for connecting thereto a vessel model, the vessel holder comprising: an elongate body having a pair of end walls separated by a pair of side walls defining a chamber, each end wall having: a holder-vessel connector configured to be connected with an open end of the vessel model to attach the vessel model to the vessel holder, the holder-vessel connector defining an aperture extending through the holder-vessel connector and a respective end wall for fluidly connecting the vessel model and the vessel holder; and optionally, at least one holder-mount connector for connecting the vessel holder to a mount.

In certain embodiments, the side walls are disposed along a longitudinal direction of the elongate body.

In certain embodiments, a diameter of the holder-vessel connector has been selected based on a diameter of the blood vessel model.

In certain embodiments, the holder-mount connector is a male connector configured to be received into the open end of the vessel model, or the holder-vessel connector is a female connector configured to receive the open end of the vessel model.

In certain embodiments, the at least one holder-mount connector is configured to be received in a corresponding holder-mount aperture defined in at least one end wall of the elongate body.

In certain embodiments, the holder-mount aperture extends along a bottom edge of the at least one end wall of the elongate body and at least partially along side edges of the at least one side wall.

In certain embodiments, the holder-mount connector is shaped such that when the holder-mount connector is received in the holder-mount aperture of the at least one end wall, the holder-mount connector extends at least partially around the at least one end wall.

In certain embodiments, the holder-mount connector is U-shaped and has two arms, each arm having a free end.

In certain embodiments, each free end of the two arms of the holder-mount connector is lipped, and optionally wherein the arms can be moved relative to each other.

In certain embodiments, the vessel holder further comprises inter-engageable portions on the holder-mount connector and the holder-mount aperture.

In certain embodiments, at least a portion of the holder-mount connector is less rigid and/or more resilient than the elongate body of the vessel holder.

In certain embodiments, the at least one holder-mount connector is configured to connect the vessel holder to a plurality of different mounts.

In certain embodiments, the vessel holder further comprises a clip configured to extend at least partially around a top portion of the vessel model when it is attached to the holder-vessel connector, the clip being removably attachable to the vessel holder.

In certain embodiments, the clip is substantially u-shaped and has two free ends configured to be received in corresponding openings in the elongate body of the vessel holder.

In certain embodiments, each free end of the two arms of the clip is lipped, and optionally wherein at least one of the arms can be moved relative to the other.

In certain embodiments, the vessel holder further comprising inter-engageable portions on the clip and the vessel holder.

In certain embodiments, at least a portion of the clip is less rigid and/or more resilient than the elongate body of the vessel holder.

In certain embodiments, the mount comprises: a housing for simulating a surgical scenario using the vessel model, and In certain embodiments, the mount comprises: a laboratory stand for testing the vessel model after the simulating the surgical scenario.

From another aspect, there is provided a method of testing an integrity of a vessel model after a simulated surgery, the method comprising: attaching the vessel model to a vessel holder after the simulated surgery, the vessel holder comprising: an elongate body having a pair of end walls separated by a pair of side walls defining a chamber, each end wall having: a holder-vessel connector configured to be connected with an open end of the vessel model to attach the vessel model to the vessel holder, the holder-vessel connector defining an aperture extending through the holder-vessel connector and a respective end wall for fluidly connecting the vessel model and the vessel holder; and causing a fluid to flow through the aperture and into the vessel model.

In certain embodiments, the causing the fluid to flow through the aperture comprises attaching a syringe to the end wall and pushing the fluid from the syringe to the vessel model.

In certain embodiments, the method further comprises collecting any fluid that has collected in the chamber to assess the integrity of the vessel.

In certain embodiments, the fluid is a polymerizable material, the method further comprising: allowing the polymerizable material to polymerize to form a mold of an inner surface of the vessel model; and removing the polymerized material for further testing.

In certain embodiments, the further testing comprises: imaging a surface of the polymerized material.

In certain embodiments, the method further comprises, prior to causing the fluid to flow through the aperture and into the vessel model, de-airing the vessel model.

In certain embodiments, the method further comprises attaching the vessel holder to a mount before causing the fluid to flow through the aperture.

From a yet further aspect, there is provided a method of producing a vessel model with simulated fatty tissue thereon, the method comprising: obtaining a vessel model; obtaining a base for the vessel model; obtaining a fatty tissue mold for applying a simulated fatty tissue around the vessel model, the fatty tissue mold having two mold components which, when assembled, define: a chamber configured to accommodate therein the base, the chamber having an open top face and defined by a base wall, a pair of side walls, and front and back walls of the fatty tissue mold; and a channel extending laterally across each one of the pair of side walls and configured to receive the vessel model so that the vessel model extends between the pair of side walls; placing the base in the chamber such that it rests on the base wall; placing the vessel model in the channel and extending across the chamber between the pair of side walls; placing the simulated fatty tissue in the chamber through the open top face onto the vessel model; and separating the two mold components and removing the base with the thus formed vessel model with fatty tissue thereon. The vessel model may be simulating a blood vessel or any other body part.

In certain embodiments the channel is spaced from the base wall such that when the fatty tissue mold receives the base and the vessel model, the upper surface of the base is spaced from the vessel model to permit the simulated fatty tissue to be applied around the vessel mode, and the placing the simulated fatty tissue further comprises placing the simulated fatty tissue between the upper surface of the base and the vessel model.

In certain embodiments, the simulated fatty tissue is made of a polymeric material, and the placing the simulated fatty tissue comprises placing a precursor fatty tissue material on the vessel model in a pre-polymerized state, and permitting polymerization of the precursor fatty tissue material to occur.

In certain embodiments, the polymeric material is a silicone-based polymeric material.

In certain embodiments, the method further comprises producing the base, the base being made of a polymeric material, the producing comprising: obtaining a base mold, the base mold having two base mold components, which, when assembled, define a base mold chamber having an open top face, an inner surface of the base mold chamber being representative of a configuration of the base; placing a precursor base material in the base mold chamber, through the open top face, and permitting polymerization of the precursor base material to occur; separating the two base mold components to remove the base thus produced.

In certain embodiments, the base mold is configured for producing the base of a shape suitable for being received by the chamber of the fatty tissue mold.

In certain embodiments, the polymeric material of the base is different from the polymeric material of the simulated fatty tissue.

In certain embodiments, the polymeric material of the base simulates underlying tissue of the vessel within a body of a subject.

In certain embodiments, the underlying tissue simulated by the polymeric material of the base comprises one or more of: an epicardium, a myocardium, and an endocardium of a heart of the subject.

In certain embodiments, the method further comprises using the vessel model with fatty tissue thereon for reproducing a given surgical scenario. In certain embodiments, the given surgical scenario is a vascular anastomosis between a blood vessel and an other blood vessel.

In certain embodiments, a height of the channel from the open top face of the chamber is selected based on a desired thickness of the simulated fatty tissue around the vessel model, the desired thickness being of one of a plurality of predetermined thickness values, each one of the plurality of thickness values is associated with a respective one of a plurality of complexity levels of the given surgical scenario.

In certain embodiments, the inner surface of the channel has been determined based at least on image data associated with the vessel including a representation of the fatty tissue attached thereto.

In certain embodiments, the image data includes a computed tomography scan of a region of a body of the subject including the vessel.

From another aspect, there is provided a positioner for positioning a first vessel model relative to a second vessel model attached to the first vessel model, the positioner comprising: a base including a top surface and a bottom surface, the top surface defining a vessel model channel configured to accommodate therein the first vessel model; and an arm extending outwardly from the base and configured to be coupled to the second vessel model for manipulating a position thereof relative to the first vessel model.

In certain embodiments, the arm is moveably attached to the base by an arm joint configured to provide to the arm at least three degrees of freedom of movement.

In certain embodiments, the arm comprises a connector portion configured to support the second vessel model, the connector portion having a profile configured to follow, at least partially, a surface of the second vessel model.

In certain embodiments, the arm further comprises a support portion extending outwardly from the base and configured to be coupled to the arm joint, such that the connector portion, the arm joint, and the support portion are disposed sequentially.

In certain embodiments, the positioner further comprises a retainer extending outwardly from the base and configured to connect thereto the second vessel model in a given one of a plurality of predetermined positions relative to the first vessel model.

In certain embodiments, both the arm and the retainer extend from the top surface of the base.

In certain embodiments, the arm and the retainer are disposed at opposite ends of the vessel model channel.

In certain embodiments, the connector portion of the arm extends towards the retainer.

In certain embodiments, the retainer has a retainer body connected to the base by a retainer joint, the retainer joint being configured to allow a rotation to the retainer body about a joint axis of the retainer joint, the retainer joint connected to the base so that the joint axis extends along the vessel model channel.

In certain embodiments, the retainer body defines positioning apertures, the positioning apertures arranged in an array to permit connection of the second vessel model to the retainer body in the plurality of predetermined positions In certain embodiments, the given one of the plurality of predetermined positions is associated with a respective height value from the top surface and a respective lateral distance value from the vessel model channel.

In certain embodiments, the retainer joint is received in an opening in the base extending below the top surface thereof.

In certain embodiments, the retainer joint defines additional positioning apertures so that: when the retainer body is in a neutral position, the additional positioning apertures are below the top surface of the base; and when the retainer body is rotated around the joint axis, at least one of the additional positioning apertures is above the top surface of the base.

In certain embodiments, the retainer joint has a circular profile.

In certain embodiments, the retainer body defines two prongs configured to receive therebetween the second vessel model.

In certain embodiments, the connection of the second vessel model to the retainer body in the given one of the plurality of predetermined positions comprises using a bracket configured to be received in a respective pair of one of the positioning apertures and the additional positioning apertures.

In certain embodiments, the retainer body is inclined away from the top surface of the base.

In certain embodiments, the top surface defines a cavity around a portion of the vessel model channel, so that when the positioner receives the first and second vessel models, an attachment region therebetween is positioned over the cavity.

In certain embodiments, the bottom surface defines an open channel extending transversely to the vessel model channel under the cavity.

In certain embodiments, the open channel is configured to accommodate therein a leakage container.

In certain embodiments, the cavity is defined in a middle portion of the top surface of the base, between the retainer and the arm.

In certain embodiments, the first and second vessel models attached therebetween represent a vascular anastomosis between two vessels.

From another aspect, there is provided a method of positioning a first vessel model relative to a second vessel model attached to the first vessel model, the second vessel model being attached to the first vessel model along an attachment region, the method comprising: obtaining the first vessel model and attached thereto the second vessel model; obtaining a positioner, the positioner comprising: a base including a top surface and a bottom surface, the top surface defining a vessel model channel configured to accommodate therein the first vessel model; and an arm extending outwardly from the base and configured to be coupled to the second vessel model for manipulating a position thereof relative to the first vessel model, the arm being configured to provide at least three degrees of freedom to a portion of the arm coupled to the second vessel model; placing the first vessel model in the vessel model channel; attaching the second vessel model to the arm; positioning, using the arm, the second vessel model in a desired position relative to the first vessel model; causing testing the attachment region between the first vessel model and the second vessel model in the desired position; and disconnecting both the first and second vessel models from the positioner.

In certain embodiments, the positioner further comprises a retainer extending outwardly from the base and configured to connect thereto the second vessel model in a plurality of predetermined positions relative to the first vessel model; and wherein the positioning the second vessel model in the desired position further comprises connecting the second vessel model to the retainer in a given one of the plurality of predetermined positions.

In certain embodiments, the given one of the plurality of predetermined positions is associated with a respective height value from the top surface and a respective lateral distance value from the vessel model channel.

In certain embodiments, the testing comprises: filling at least one of the first and second vessel models with a test fluid in the desired position; and determining if there is a leakage of the test fluid through the attachment region between the first and second vessel models.

In certain embodiments, the first and second vessel models attached therebetween represent a vascular anastomosis between two blood vessels.

From another aspect, there is provided a vessel model connector for detachably attaching a vessel model to a 3D base, the vessel model connector comprising a vessel part and a base part configured to detachably attach together, wherein the vessel part is configured to attach to the vessel model and the base part is configure to attach to the 3D base.

In certain embodiments, one of the vessel part and the base part has a dovetail configuration.

From another aspect, there is provided a vessel model connector for detachably attaching a vessel model to a 3D base, the vessel model connector comprising a ring having an internal surface and an external surface, at least one stud extending from the external surface and configured to be at least partially received in a stud opening in the wall of the vessel model, and at least one protrusion extending from the internal surface for engagement with the 3D base or with a component that can be attached to the 3D base.

In certain embodiments, the stud has a waist that engages with the stud opening.

In certain embodiments, the at least one stud extends from a vessel end of the ring, and wherein the vessel end is configured to be received in an open end of the vessel model.

In certain embodiments, the at least one stud extends outwardly from a base end of the ring.

From another aspect, there is provided a kit comprising a 3D base that simulates an anatomical scenario, at least one vessel holder that is removably connectable to the 3D base, at least one vessel model that is removably connectable to the at least one vessel holder, and at least one vessel model connector.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
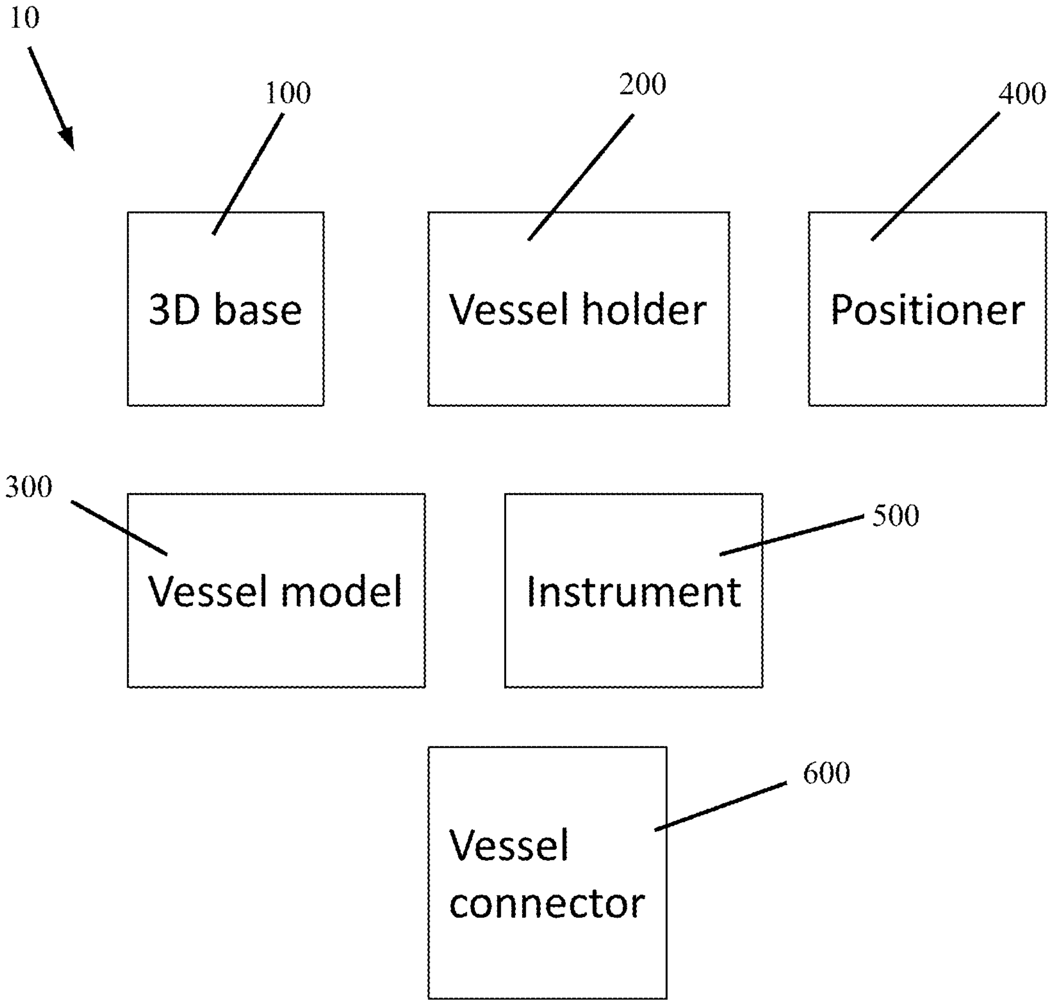
FIG. 1 is a schematic illustration of a kit for surgical training including one or more of a 3D base, a vessel holder, a vessel model, a vessel model connector, a positioner and an instrument, according to certain embodiments of the present technology.

Referring to FIG. 1, there is shown a surgical suture training kit 10 according to certain embodiments of the present technology. The surgical training kit 10 is modular and includes different modules that can be interchangeably connected together. Each module may have differing size, shape and/or anatomical stimulation. The modules of the kit comprise one or more of:

one or more 3D bases 100 simulating respective anatomical scenarios;

one or more vessel holders 200, each of which is removeably positionable in the 3D base 100;

- one or more vessel models 300, each of which is removeably positionable in the vessel holder 200 or to the 3D base 100;
- one or more positioners 400 for positioning a graft vessel model relative to a host vessel model either during a simulated suturing, or after the suturing has occurred to test an integrity of the suturing;
- one or more instruments 500 such as, one or more of: scalpel, forceps, suture, clamps;
- one or more vessel model connectors 600; and
- instructions for use (not shown).

The kit 10 may comprise any combination of one or more of these modules.

3D Base

The 3D base 100 may simulate any desired anatomical 3D scenario in which surgical suture may be required. The surgical suture training kit 10 may include one or more such 3D bases 100 which may be the same as each other or different versions. The 3D base 100 is configured to have detachably attached thereto one or more vessel models 300, in certain embodiments.

Examples of such anatomical scenarios include, but are not limited to: coronary artery bypass graft surgery (CABG) in which a graft vessel must be attached to a coronary artery; arteriovenous (AV) fistula surgery in which an artery and a vein must be attached together to form an AV fistula; eversion endarterectomy (EEA) of the carotid artery; closure of a wound; lower extremity vascular surgical procedures including femoral, popliteal or sub-popliteal regions of the patient's body; transplant surgeries, including, without limitation, a liver and kidney transplant surgeries; anastomoses, including, for example, vascular, ureteral and enteral anastomoses; urological anastomoses, including, for example, urethral and vesicourethral anastomoses and sutures; and intestinal anastomoses. It should be expressly understood that embodiments of the present technology can also be used for other suturing anatomical scenarios. Furthermore, for each anatomical scenario, the 3D base 100 may simulate a different access vantage, for example: left anterior descending for the CABG, intermediate branch for the CABG; CABG on left anterior descending artery. The 3D base 100 may be configured to have attached thereto the vessel model 300 in a manner that recreates an obstacle at the surgery site, such as an aorta occluding access to the heart.

Figure 2A:
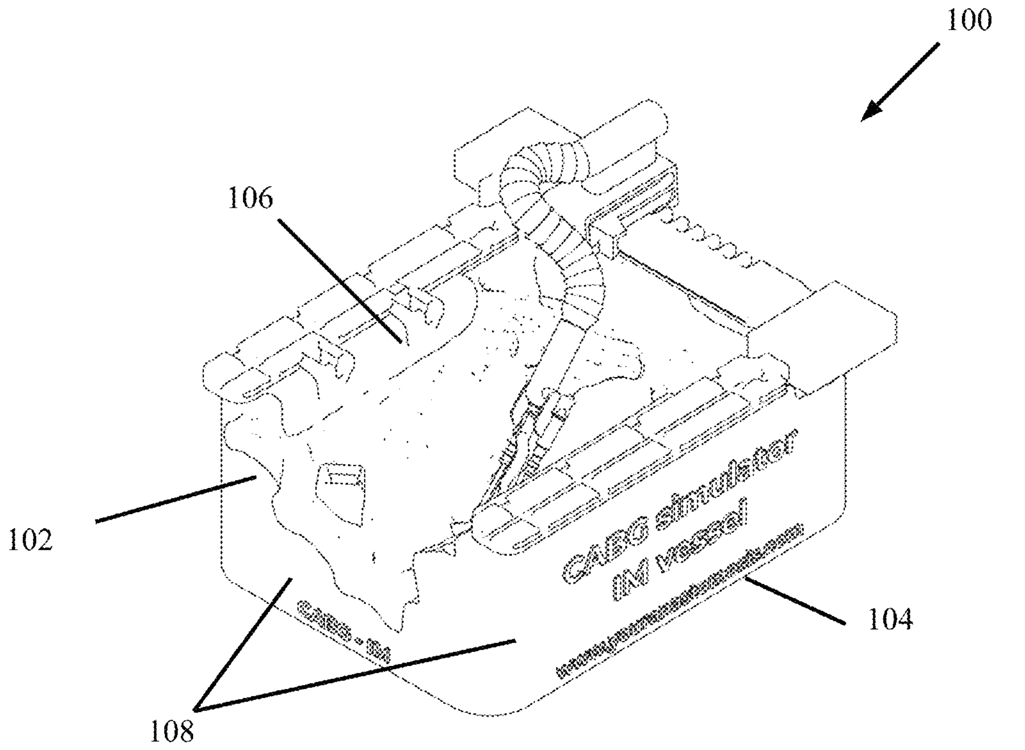
FIGS. 2A, 2B, 2C, 3A, 3B, 3C, 4A, 4B, and 4C are example 3D bases simulating different anatomical scenarios, according to certain embodiments of the present technology.
Figure 2B:
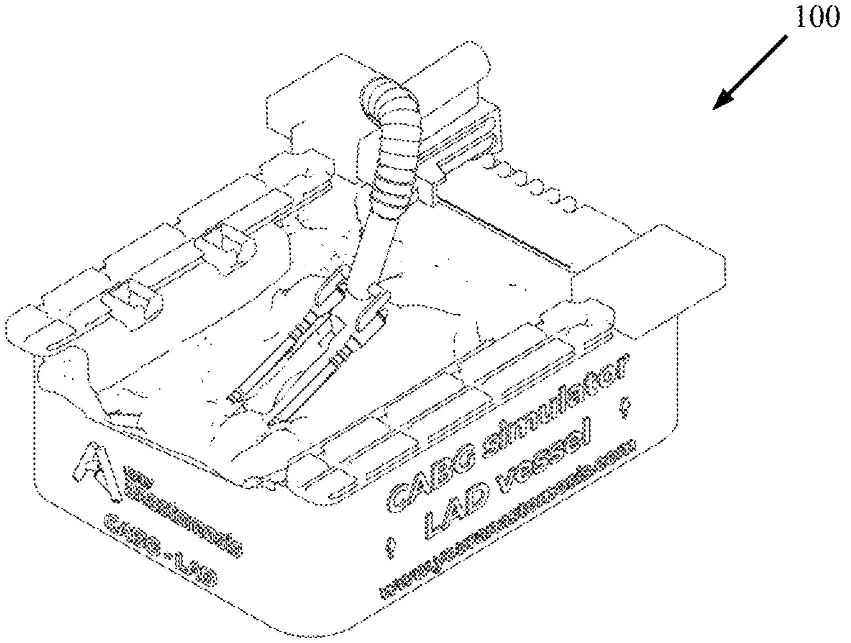
Figure 2C:
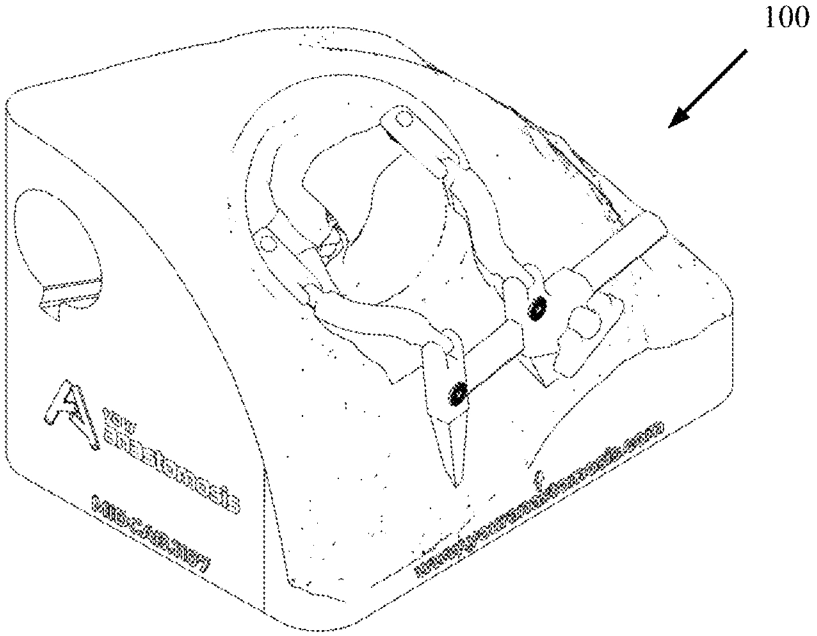

FIGS. 2A-2C illustrate example 3D bases 100 representing, respectively, a portion of patient's torso for simulating cardiovascular surgery. More specifically, FIG. 2A illustrates an example 3D base 100 representing an anatomy of a 69 year old male patient with CABG on mid—left anterior descending (LAD). The patient has diabetes and hypertonia, and presents with angina caused by 3 vessels disease. The 3D base represents off-pump coronary artery bypass (OPCAB) surgery for LAD-(left internal mammary artery (LIMA) on the mid segment of LAD. The vessel is calcified at proximal part but intact with moderately thickened wall. The 3D base presents a median sternotomy access. In certain embodiments, the kit 10 including this 3D base 100 may include eight vessel models 300 which may comprise simulated arteries.

FIG. 2B illustrates an example 3D base 100 representing an anatomy of a 72 year old female patient with CABG on an intermediate branch (IM). The patient has hypertonia and presents with angina caused by three-vessels disease (proximal LAD, IM RCA stenosis). The 3D base 100 represents the OPCAB surgery for IM revascularisation on the proximal-mid segment of IM. The vessel has substantial calcification. In certain embodiments, the kit 10 including this 3D base 100 may include eight vessel models 300 which may comprise simulated arteries.

FIG. 2C illustrates an example 3D base 100 representing an anatomy of a 43 year old male patient with minimally invasive direct CABG (MIDCAB) on left anterior descending (LAD) artery. The patient has hypertonia, presented with symptoms of effort angina Coronarography reveled significant LAD stenosis. The simulator model represents the MIDCAB surgery for LAD revascularisation on the mid segment of IM. The vessel has substantial calcification. In certain embodiments, the kit 10 including this 3D base 100 may include eight vessel models 300 which may comprise simulated arteries.

Figure 3A:
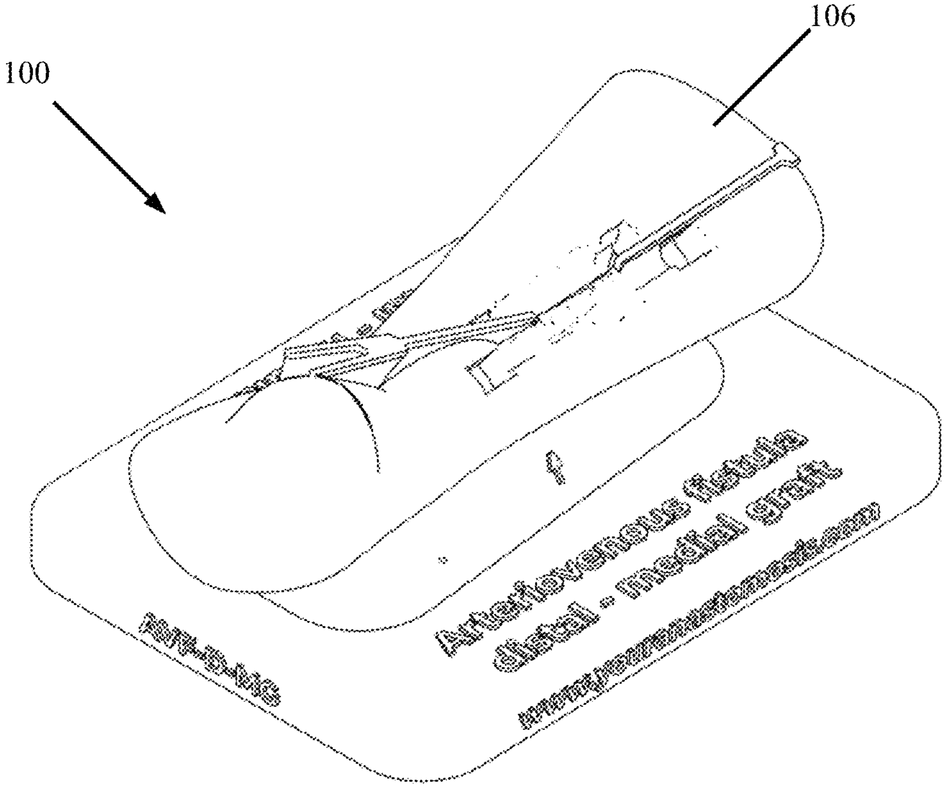
Figure 3B:
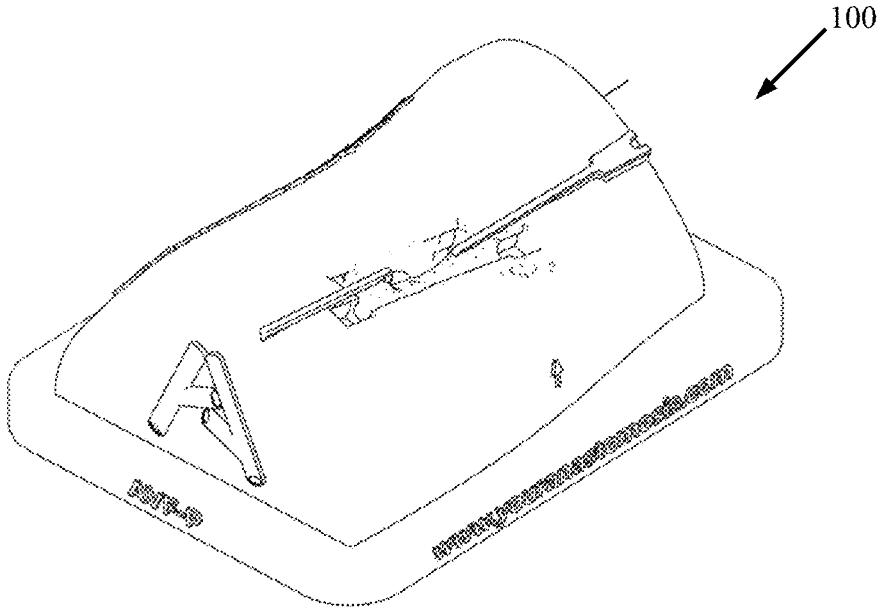
Figure 3C:
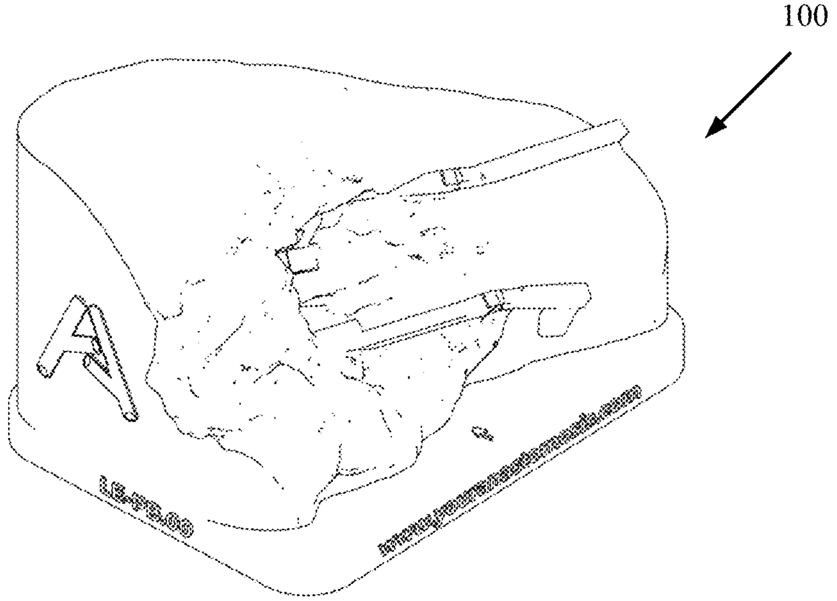

FIGS. 3A-3C illustrate example 3D bases 100 representing a portion of patient's arm. More specifically, FIG. 3A illustrates an example 3D base 100 representing an anatomy of a lower arm of a 58 old male patient for simulating arteriovenous fistula surgery. The 3D base 100 includes an anatomically correct representation of a cephalic vein (medial representation). In certain embodiments, the kit 10 including this 3D base 100 may include eight vessel models 300 which may comprise simulated arteries.

FIG. 3B illustrates an example 3D base 100 representing an anatomy of a lower arm of a 58 old male patient for simulating arteriovenous fistula surgery. The 3D base 100 includes an anatomically correct representation of a cephalic vein (lateral representation). In certain embodiments, the kit 10 including this 3D base 100 may include eight vessel models 300 which may comprise simulated arteries.

FIG. 3C illustrates an example 3D base 100 representing an anatomy of an upper arm of a 47 old male patient for simulating an arteriovenous fistula surgery. The 3D base 100 includes an anatomically correct representation of a cephalic vein (lateral representation). In certain embodiments, the kit 10 including this 3D base 100 may include eight vessel models 300 which may comprise simulated arteries.

Figure 4A:
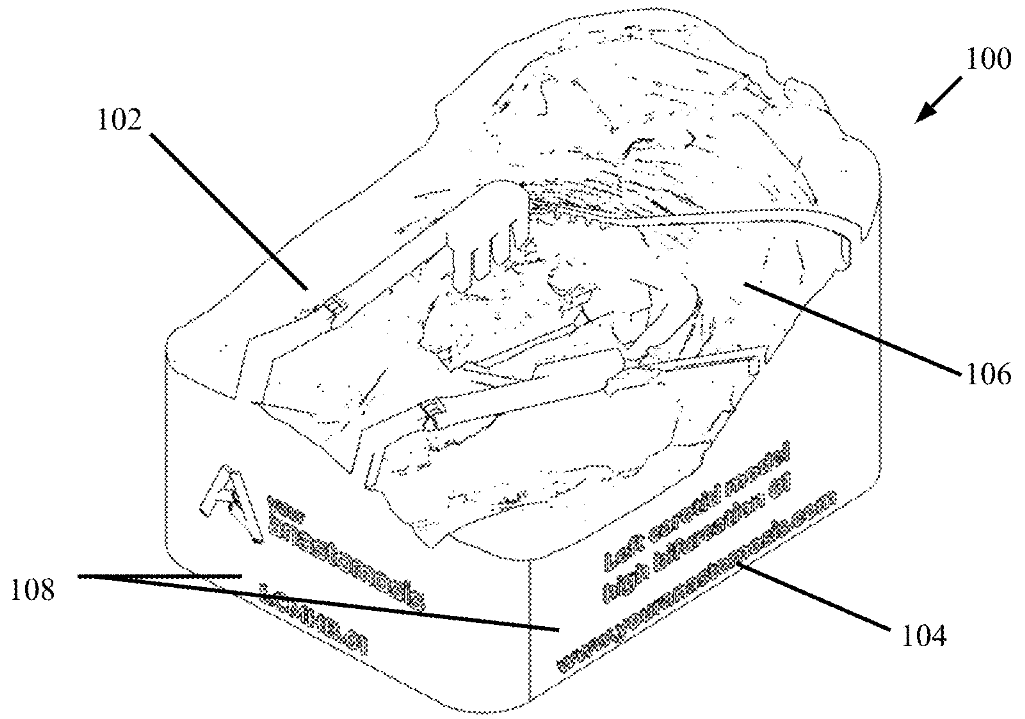

FIG. 4A illustrates an example 3D base 100 representing an anatomy of a torso of a 71 year old male patient with EEA of left carotid artery. The patient has hypertonia, a history of smoking presented with TIA caused significant stenosis of left carotid artery. The 3D base 100 represents the EEA surgery with high bifurcation of carotid artery. The situation is presented after eversion of intima and before re-anastomosis of internal carotid artery. In certain embodiments, the kit 10 including this 3D base 100 may include eight vessel models 300 which may comprise simulated arteries.

Figure 4B:
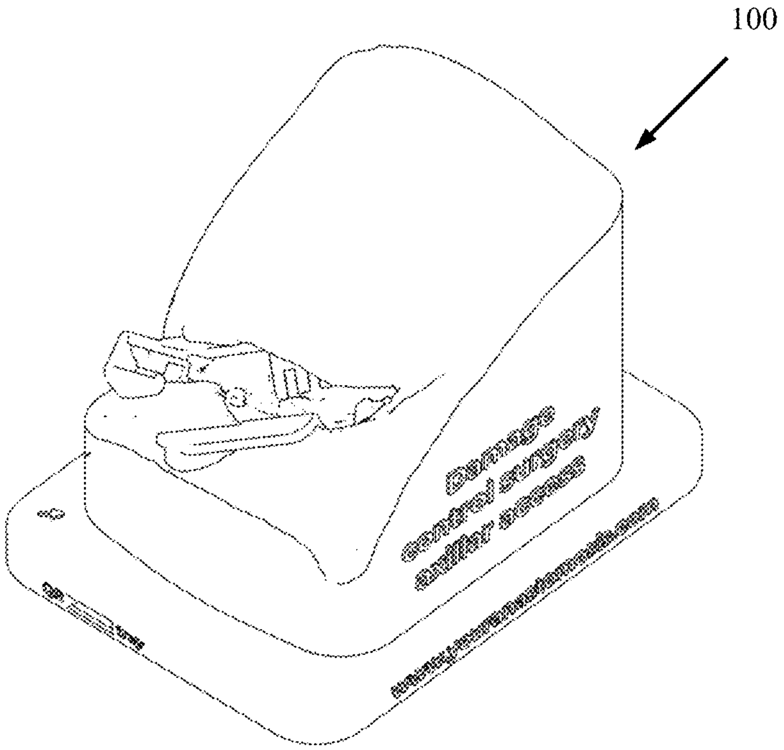

FIG. 4B illustrates an example 3D base 100 representing an anatomy of a torso of a 32 year old male patient with battlefield injury on left upper extremity. The access is axillary access. The patient suffered a gunshot injury with severe bleeding on left upper arm. The 3D base 100 represents the anatomy after opening for axillary artery.

Figure 4C:
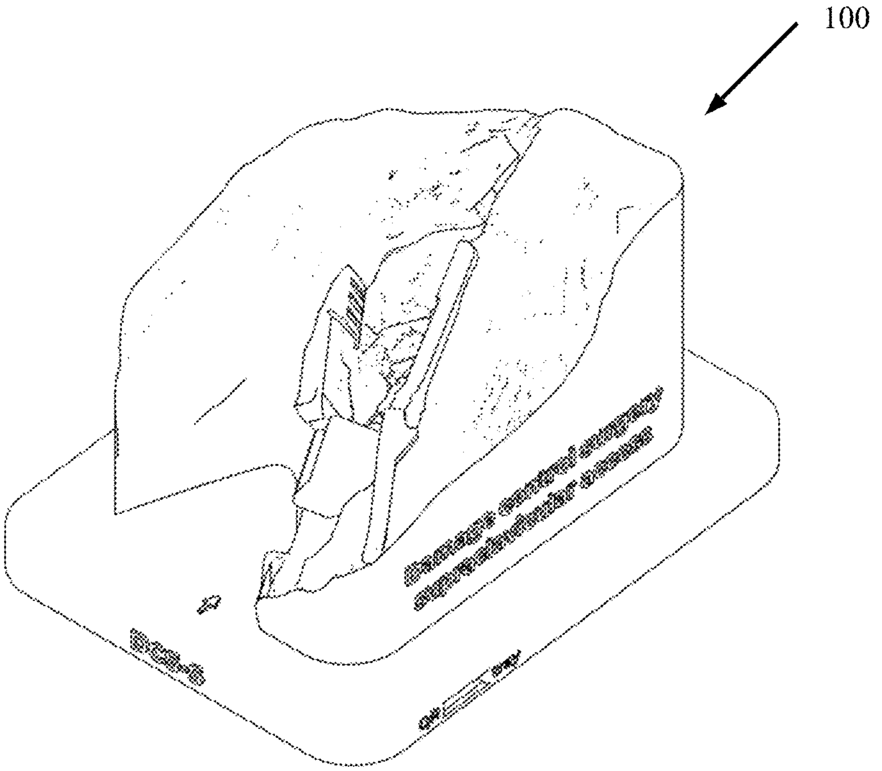
Figure 5:
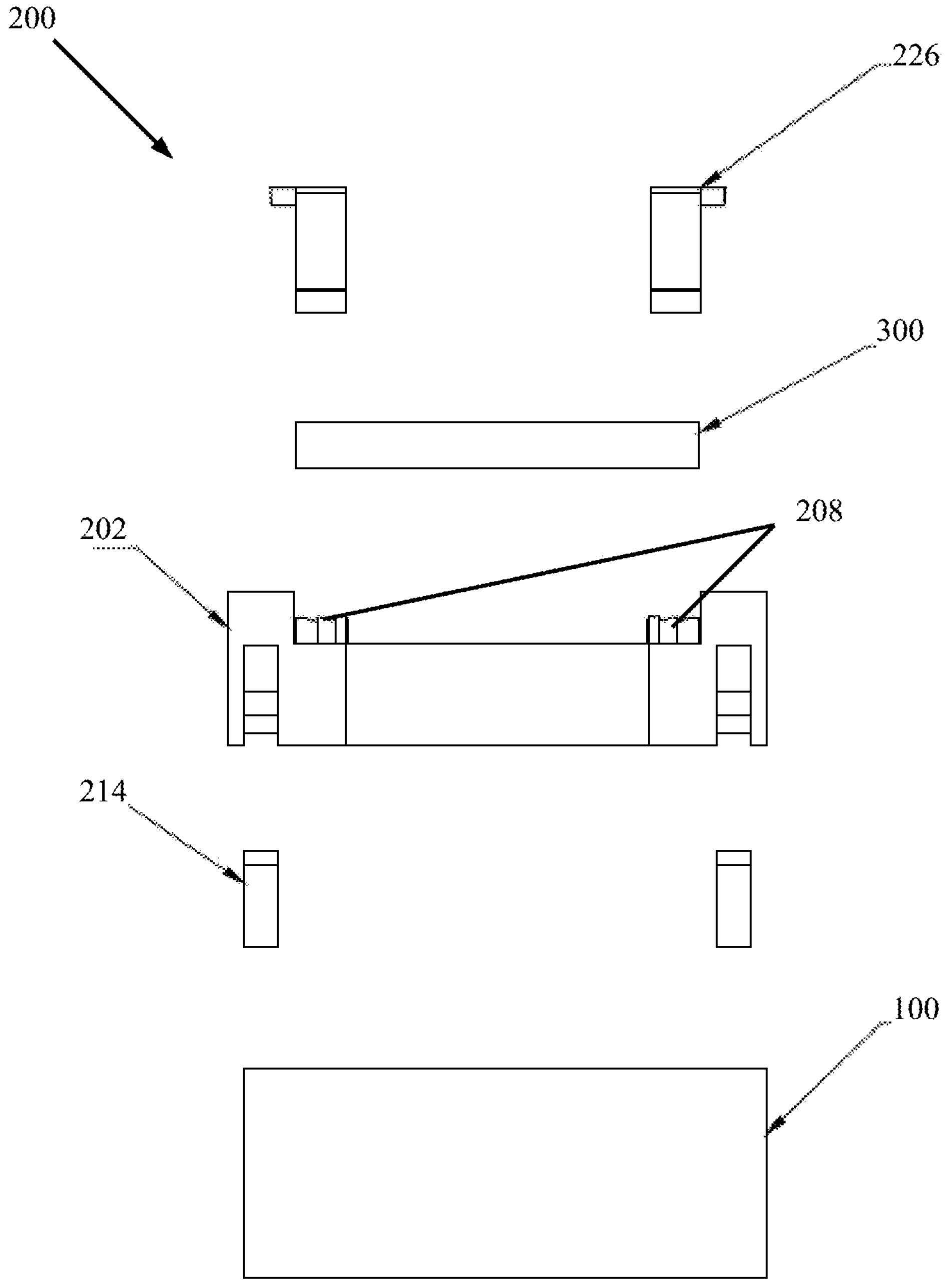
FIG. 5 is an exploded view, from the side, of a vessel holder and a vessel model, according to certain embodiments of the present technology.

FIG. 4C illustrates an example 3D base 100 representing an anatomy of right axillary/subclavian region of a 28 year old male patient with battlefield injury. The patient suffered a combustion injury with severe bleeding on right upper arm/subclavian region. The 3D base 100 represents the anatomy after opening for subclavian artery.

In certain embodiments, the 3D base 100 is formed from a 3D digital model, such as by 3D printing, or by molding. The 3D base 100 may be made of any suitable material such as silicone. The 3D digital model may be generated using image data of an anatomy of patient. For example, according to certain non-limiting embodiments of the present technology, the 3D digital model can be generated and further stored in various formats, such as, without limitation, STL, OBJ. PLY, DICOM, and various software-specific, proprietary formats.

According to certain non-limiting embodiments of the present technology, the 3D digital model can be generated using image data captured by an imaging device, such as a 3D scanner. More specifically, according to certain non-limiting embodiments of the present technology, the 3D scanner can be configured to scan a given portion of the patient's anatomy associated with one of the anatomical scenarios non-exhaustively listed above, thereby generating a 3D point cloud indicative of a surface of the given portion of the patient's anatomy, which defines the 3D digital model.

In a specific non-limiting example, the 3D scanner can be of one of the EinScan types available from SHINING 3D Tech. Co., Ltd. of 1398, Xiangbin Road, Wenyan, Xiaoshan, Hangzhou, Zhejiang, China, 311258. It should be expressly understood that the 3D scanner can be implemented in any other suitable equipment, such as a light and laser scanner, or in this work in resolution.

Also, it should be expressly understood that other imaging device, exploiting other imaging techniques, can be used for generating the 3D digital model of the given portion of the patient's anatomy without departing from the scope of the present technology. For example, in some non-limiting embodiments of the present technology, the 3D scanner can be configured to generate a 3D mesh (such as triangular mesh) representative of a surface of the given portion of the patient's anatomy and further convert the 3D mesh in the 3D point cloud. In other non-limiting embodiments of the present technology, the image data can be generated by a Magnetic Resonance Imaging (MRI) device, a Computed Tomography (CT) device, or an x-ray device.

Each 3D base 100 has a body 102 having a lower surface 104 which can be positioned on a working surface, such as a table, in use. The lower surface 104 may include an anti-slip feature (not shown) so that the 3D base 100 does not move when it is being manipulated during simulated surgery. The anti-slip feature may comprise footpads, adhesive silicone putty, or the like. The anatomical scenario is defined in an upper surface 106 of the body 102. The upper surface 106 may be generally concave or convex. This configuration replicates most types of surgery conducted on a patient lying on a bed with the surgeon approaching the surgical site from above. In other embodiments, the anatomical scenario may be defined in one or more side surfaces 108 of the body 102. It will be appreciated that the anatomical scenario defined in the upper surface 106 has a 3D topology.

Other configurations of 3D bases 100 are within the scope of the present technology.

Vessel Holders

Broadly, the vessel holder 200 comprises a device which is configured to removably support the vessel model 300 thereon. In certain embodiments, the vessel holder 200 is used to detachably connect the vessel model 300 to the 3D base 100. In certain embodiments, the vessel holder 200 is used for testing the integrity of the surgery, such as by causing a fluid to flow through the vessel model 300 and checking for leaks.

Referring to FIGS. 5-8, the vessel holder 200 broadly comprises an elongate body 202 having a chamber 203 defined therein, the chamber 203 being open at a top end of the elongate body. The elongate body 202 has a pair of end walls 204 separated by a pair of side walls 206. The end walls 204 and side walls 206 define the chamber 203. The side walls 206 extend along a longitudinal direction of the elongate body 202. When the vessel model 300 is connected to the vessel holder 200, the vessel model 300 extends substantially along the longitudinal direction of the elongate body 206.

Each end wall 204 has a holder-vessel connector 208 configured to connect the vessel model 300 to the vessel holder 200. More specifically, the holder-vessel connector 208 is configured to connect with an open end 302 of the vessel model 300.

The holder-vessel connector 208 defines an aperture 210 extending therethrough, the aperture 210 also extending through the respective end wall 204 for fluidly connecting the 300 vessel model and the vessel holder 200. A diameter of the holder-vessel connector 208 may be selected based on a diameter of the vessel model 300.

In certain embodiments, as best seen in FIGS. 5-9, the holder-vessel connector 208 is configured as a male connector extending from the end wall 204 and having a free end 212 configured to be received into the open end 302 of the vessel model 300.

In certain embodiments, the holder-vessel connector 208 is a female connector (not shown) configured to receive the open end 302 of the vessel model 300.

The vessel holder 200 further comprises a holder-mount connector 214 for connecting the vessel holder 200 to a mount. In certain embodiments, the mount is the 3D base 100 or a connector for connecting to the 3D base. In certain embodiments, the mount is a laboratory stand for testing an integrity of the vessel model 300 after the simulated surgery. The holder-mount connector 214 is removably connectable to the vessel holder 200 and to the mount.

Figure 6:
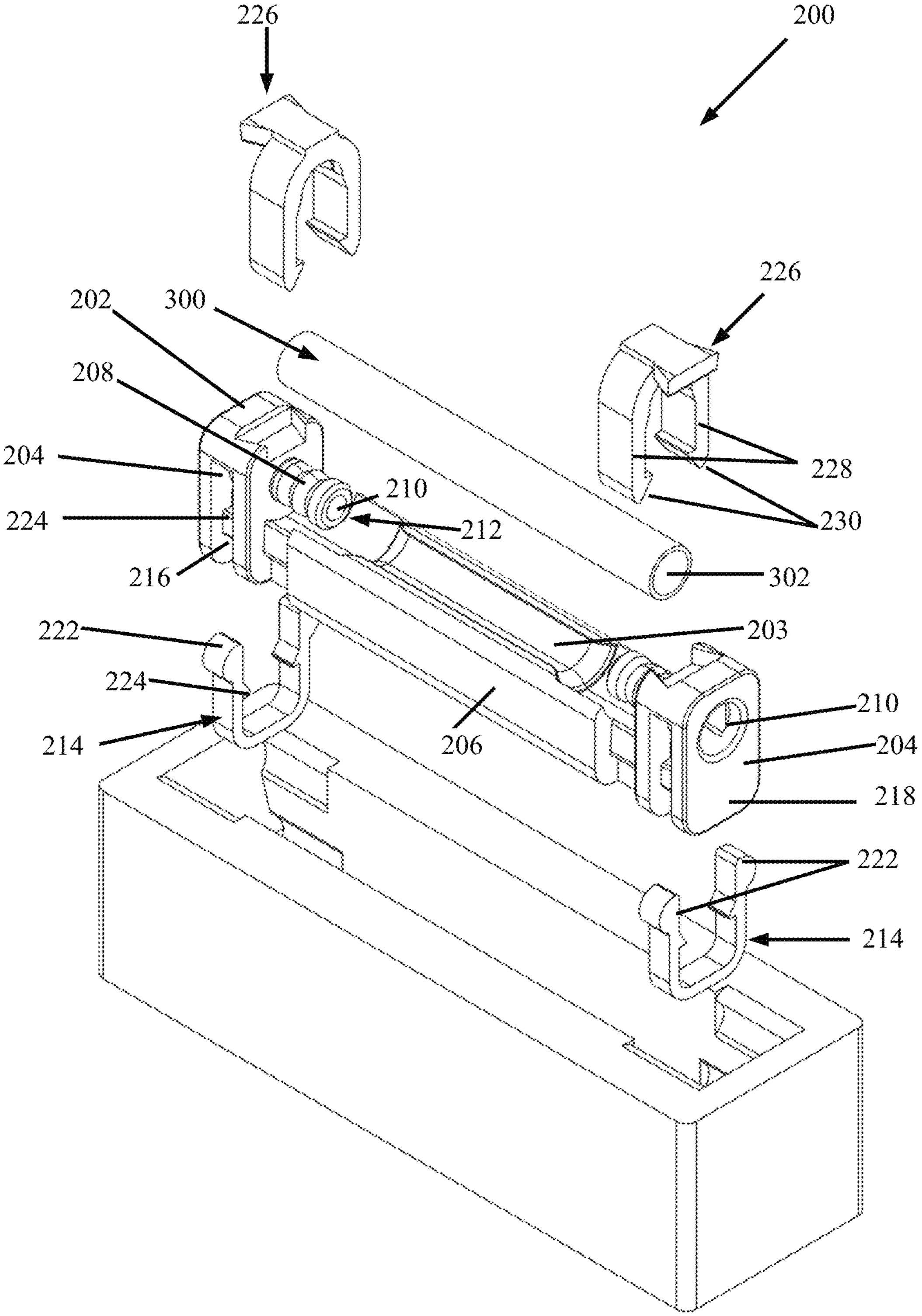
FIG. 6 is an exploded perspective view of a vessel holder and a vessel model, according to certain embodiments of the present technology.
Figure 7:
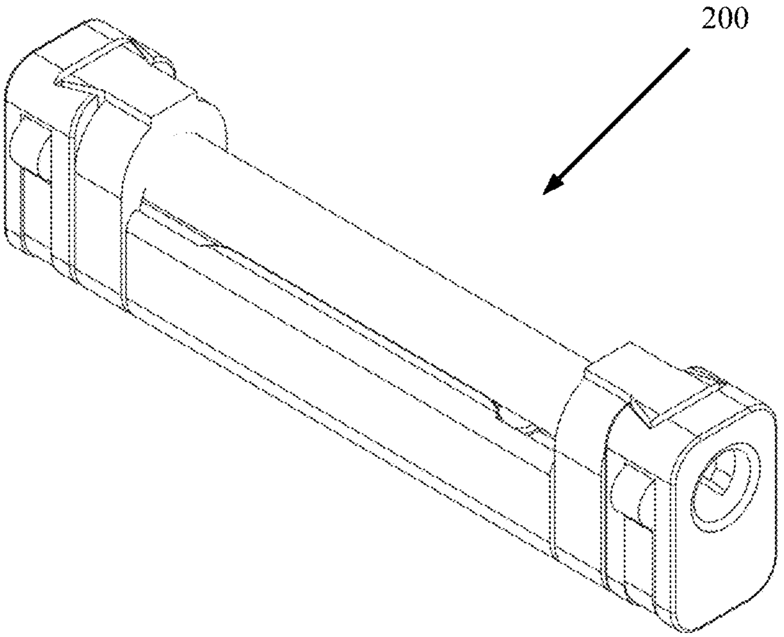
FIG. 7 is a perspective view of a vessel holder, according to certain embodiments of the present technology.
Figure 8:
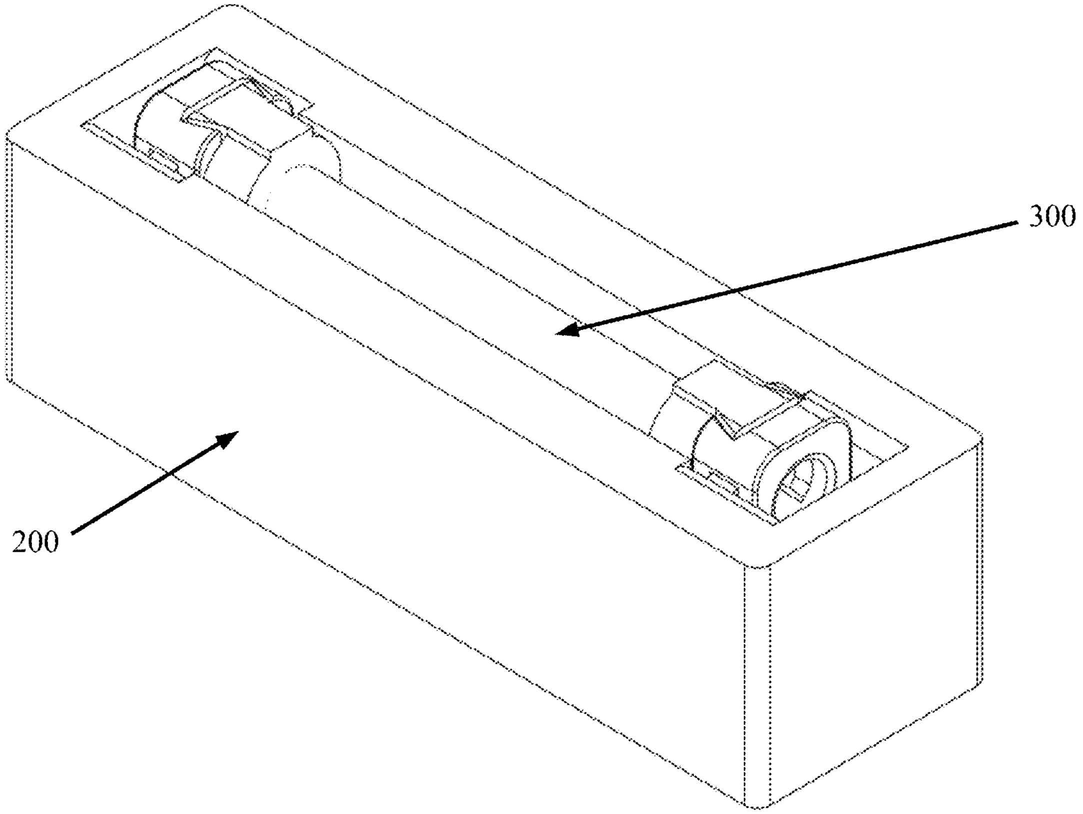
FIG. 8 is a perspective view of a vessel holder and a vessel model, according to certain embodiments of the present technology.
Figure 9A:
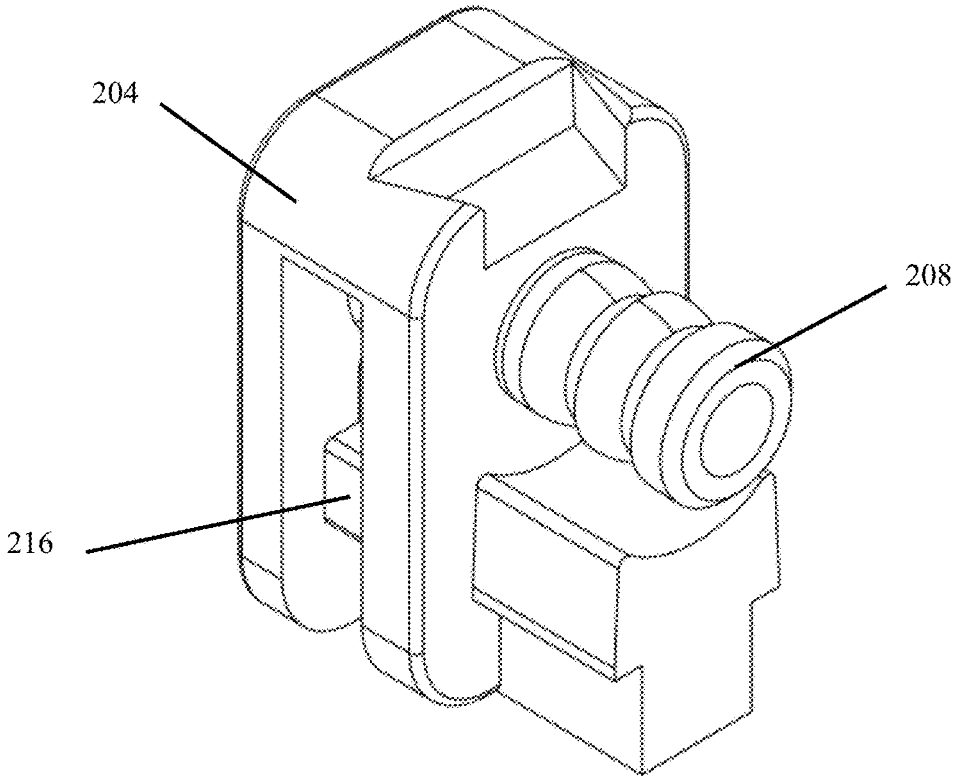
FIGS. 9A and 9B are perspective and side views, respectively, of an end portion of a vessel holder, according to certain embodiments of the present technology.
Figure 9B:
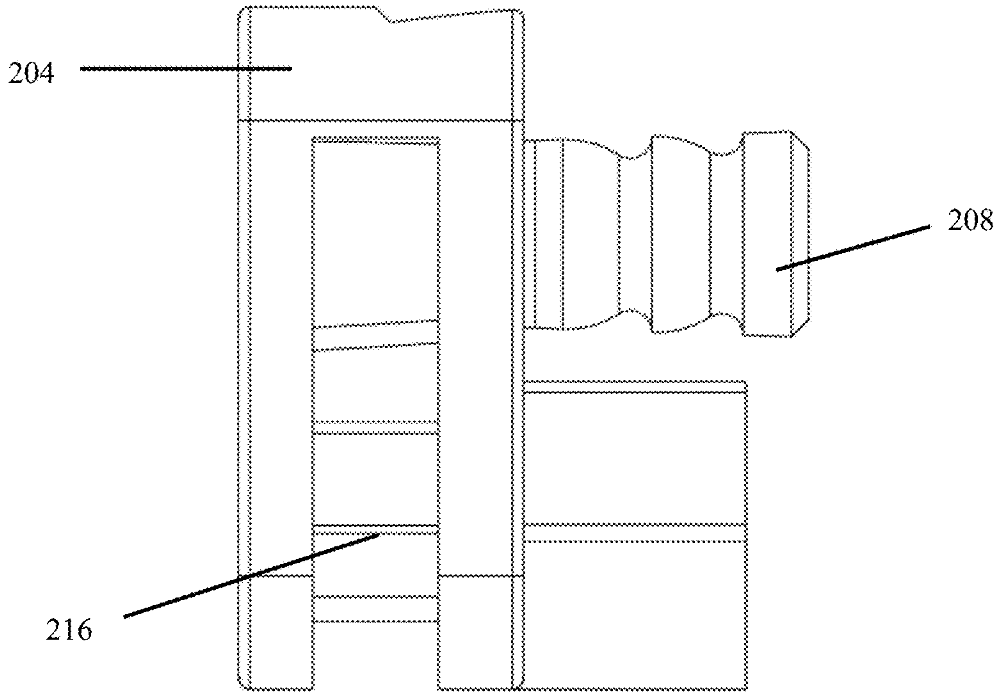
Figure 10:
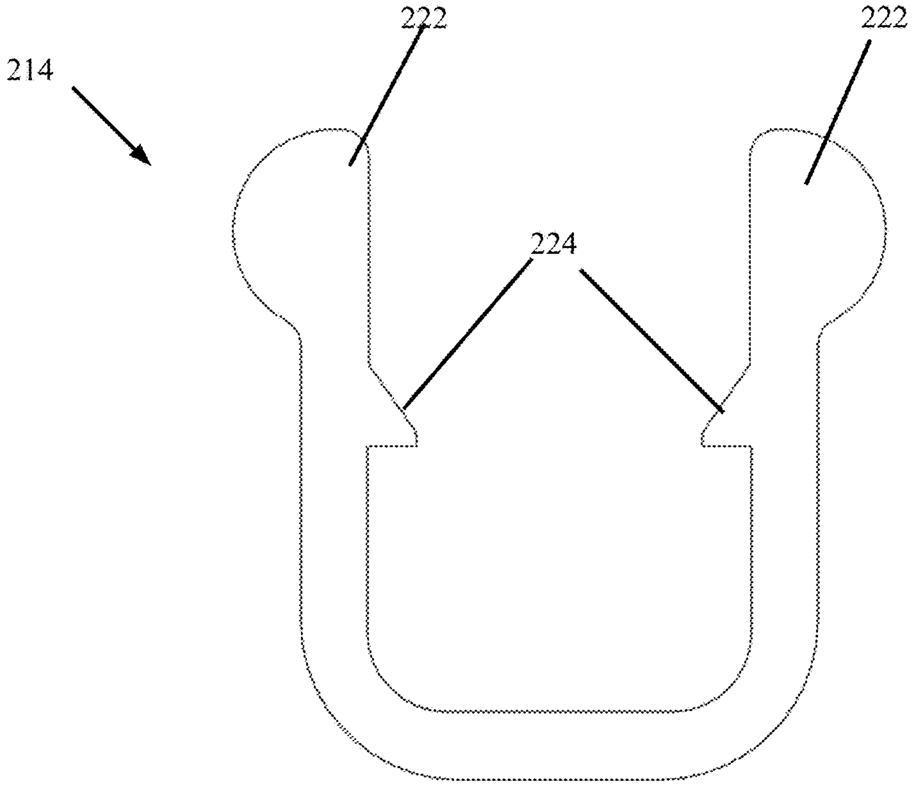
FIG. 10 is a plan view of a holder-mount connector for connecting a vessel holder to a 3D base, according to certain embodiments of the present technology.
Figure 11:
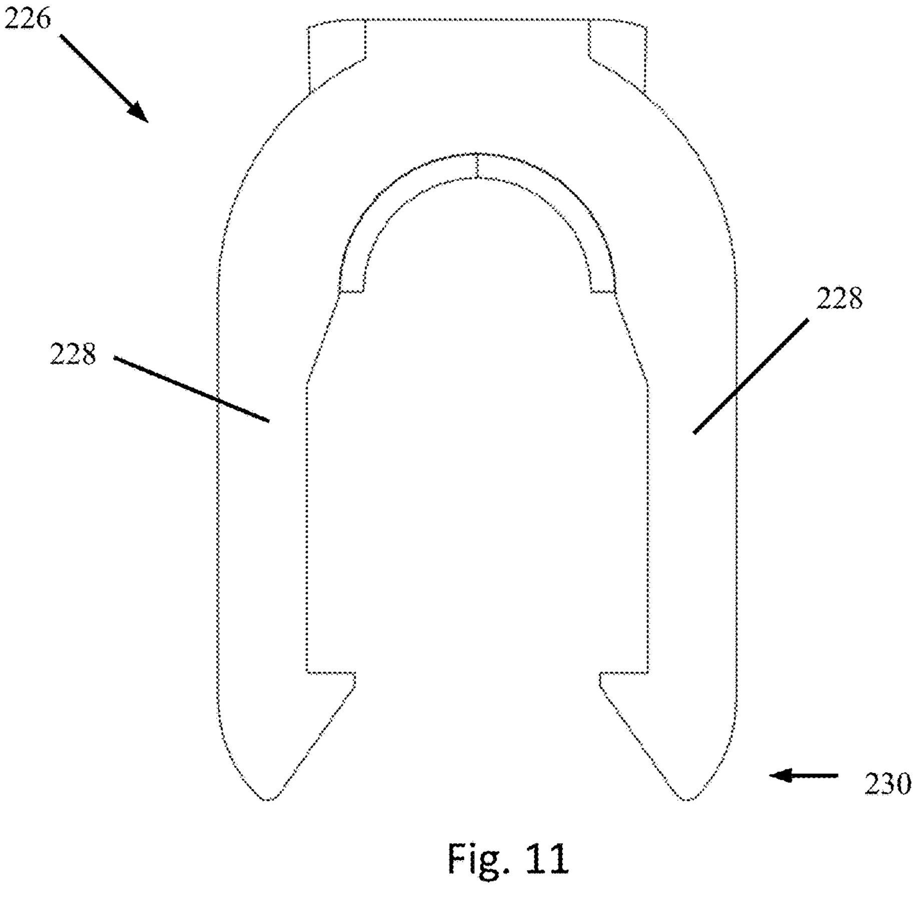
FIG. 11 is a plan view of a clip for securing a vessel model to a vessel holder, according to certain embodiments of the present technology.

As best seen in FIGS. 6 and 10, the holder-mount connector 214 comprises a bracket-shaped member shaped and sized to be received in a correspondingly shaped inset (holder-mount aperture 216) in each of the end walls 204. The holder-mount aperture 216, at each end wall 204, is defined along a bottom edge 218 of the end wall 204 and extends upwardly at least partially along side edges 220.

The holder-mount connector 214 is shaped such that when the holder-mount connector 214 is received in the holder-mount aperture 216 of the at least one end wall, the holder-mount connector 214 extends at least partially around the at least one end wall 204.

The holder-mount connector 214 is U-shaped and has two arms 222, each arm 222 having a free end. The free end of each arm 222 may be lipped for engagement with a corresponding element in the holder-mount aperture 216 which can help to retain the holder-mount connector 214 in the holder-mount aperture 216. The holder-mount connector 214 and the holder-mount aperture 216 further comprise inter-engageable portions 224 which can help to retain the holder-mount connector 214 in the holder-mount aperture 216.

In certain embodiments, at least one of the two arms 222 can be moved relative to the other arm 222. In this respect, at least a portion of the holder-mount connector 208 is less rigid and/or more resilient than the elongate body 202 of the vessel holder 200.

The holder-mount connector 214 can define can indent on a bottom surface thereof configured to be received by the mounts, thereby enabling connection of the vessel holder 200 to the mounts. The connection of the vessel holder 200 to the mounts may be by any convenient mechanism such as a snap fit mechanism. The holder-mount connector 214 may be compatible with different mounts.

The holder-mount connector 214 may be manufactured by 3D-printing or any other suitable method such as molding using any material.

In certain embodiments, the vessel holder 200 further comprises a clip 226 configured to extend at least partially around a top portion of the vessel model 300 when it is attached to the holder-vessel connector 208, the clip 226 being removably attachable to the vessel holder 200.

As best seen in FIGS. 5, 6, 8 and 11, the clip 226 is substantially u-shaped and has two arms 228 each with a free end 230 configured to be received in corresponding openings in the elongate body 202 of the vessel holder 200. In certain embodiments, each free end 230 of the two arms 228 of the clip 226 is lipped for engagement with a corresponding element in the elongate body 202 which can help to retain the clip 226 in position. The clip 226 and the elongate body 202 may further comprise other inter-engageable portions (not shown) which can help for retention.

In certain embodiments, at least one of the two arms 228 can be moved relative to the other arm 228. In this respect, at least a portion of the clip 226 is less rigid and/or more resilient than the elongate body 202 of the vessel holder 200.

Figure 12:
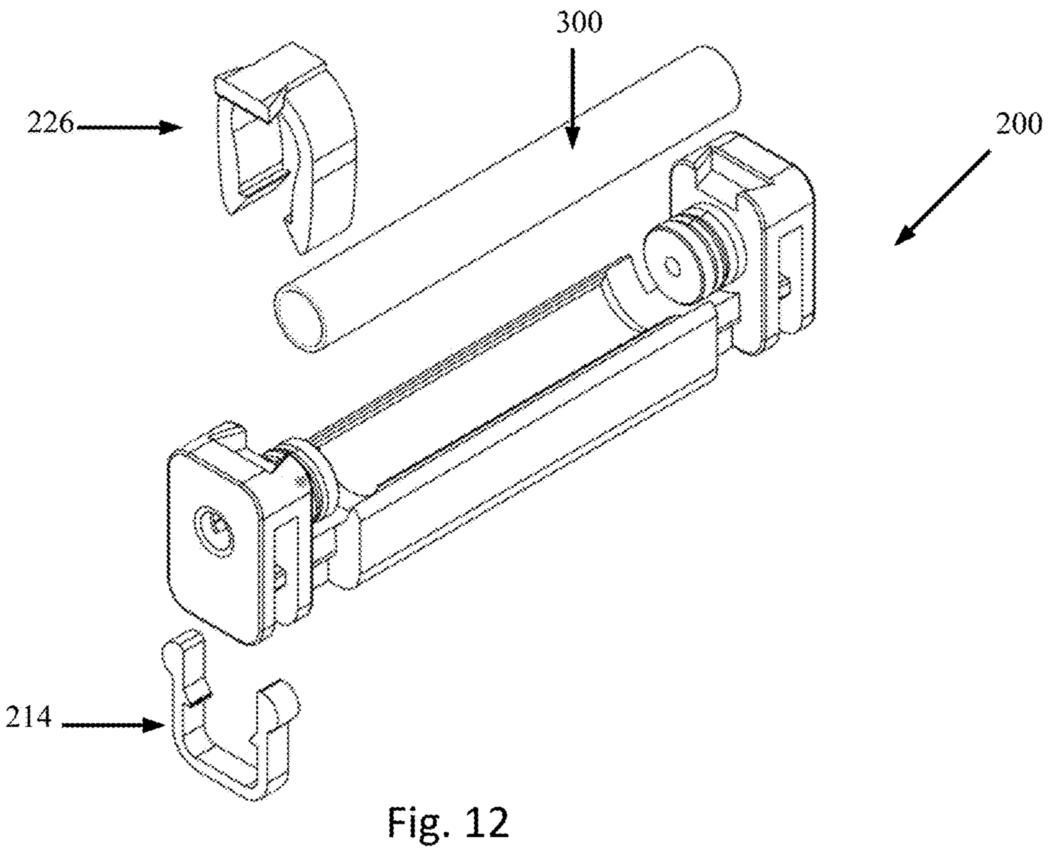
FIGS. 12 and 13 are perspective views of a vessel holder, according to certain embodiments of the present technology.
Figure 13:
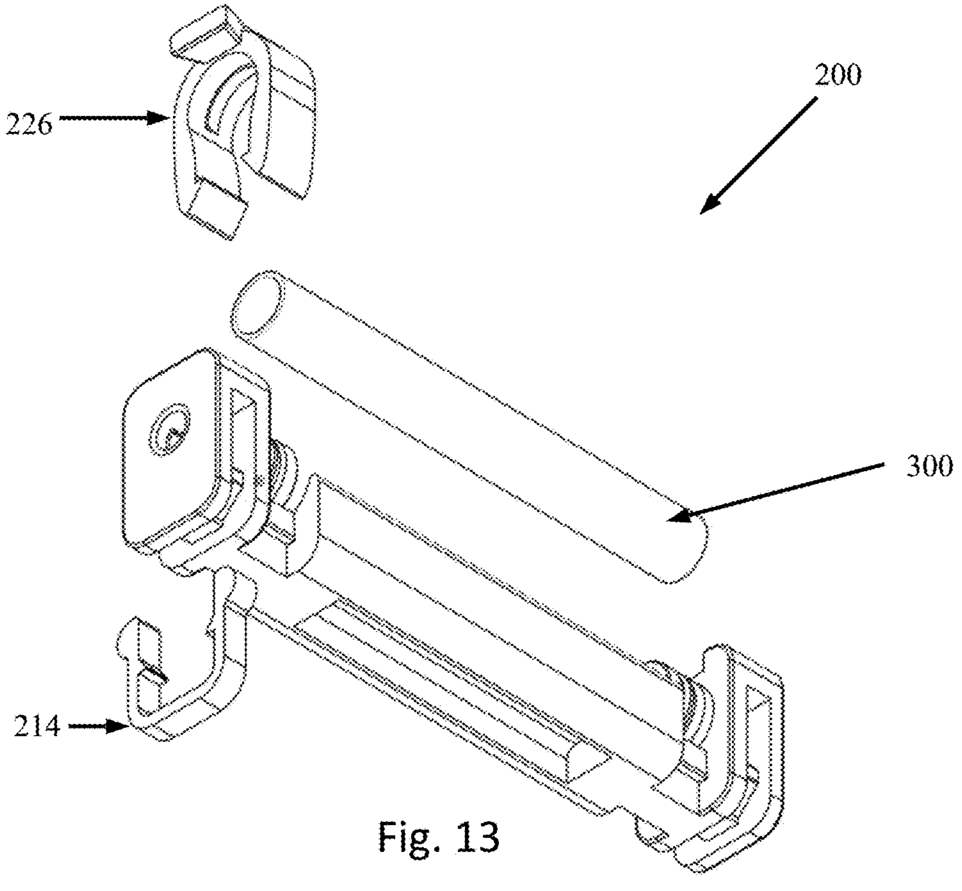

As best seen in FIGS. 12 and 13, to connect the vessel model 300 to the vessel holder 200, the vessel model 300 is attached at each open end 302 to the respective holder vessel connector 208. Optionally, the clip 226 can then be positioned over the portion of the respective holder vessel connector 208 with the vessel model 300 connected thereto, and connected to the elongate body 202 of the vessel holder 200, to further secure the connection of the holder vessel connector 208 and the vessel model 300.

As also seen in FIGS. 12 and 13, to connect the vessel holder 200 to the mount, first the holder-mount connector 214 is connected to the elongate body 202 of the vessel holder, and then the vessel holder 200 is positioned on the mount and connected thereto by the holder-mount connector 214.

As mentioned earlier, the vessel holder 200 can be removably connected to a mount which may be the 3D base 100 for surgical simulation or laboratory stand for testing an integrity of the vessel model 300 after the simulated surgery.

Components of the vessel holder 200, such as one or more of the elongate body 202, the holder-mount connector 214, and the clip 226 may be manufactured by molding, by 3D-printing or by any other suitable method. In some embodiments, at least some components of the vessel holder 200 are made of silicone such as through a casting method.

Therefore, some aspects of the present methods include (i) use of the vessel holder 200 to support the vessel model 300 during the simulated surgery, and (ii) use of the vessel holder 200 to the vessel model 300 after the simulated surgery for testing an integrity of the surgery.

Figure 24:
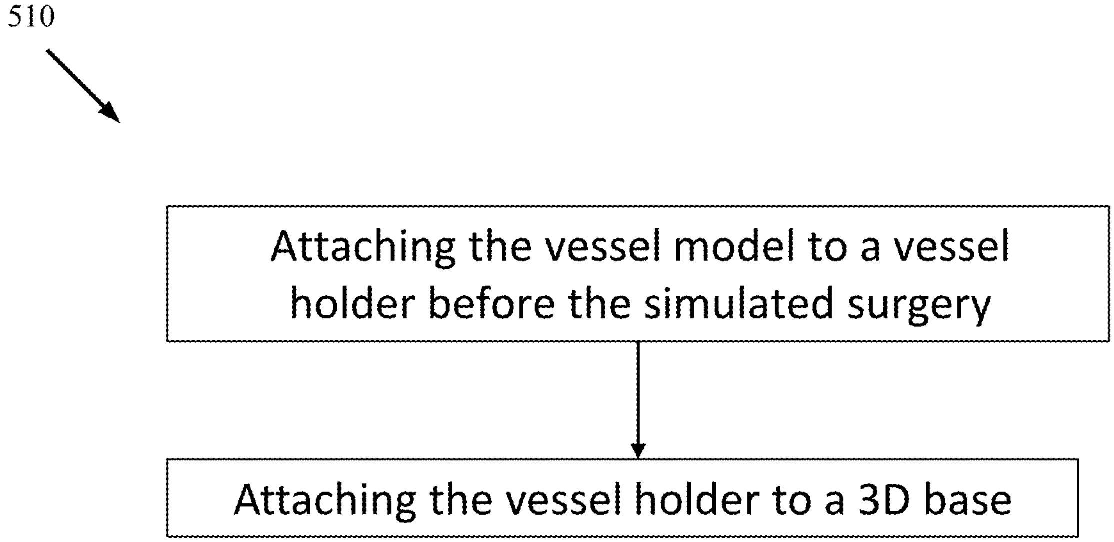
FIGS. 24 and 25 are flow diagrams for methods, according to certain embodiments of the present technology.

From one aspect, there is provided a method 510 (FIG. 24) of attaching the vessel model 300 to a vessel holder 200 before the simulated surgery, and attaching the vessel holder 200 to the 3D base 100. Once the vessel model 300 is in position on the 3D base 100, the surgical simulation may take place. In certain embodiments, the simulated surgery comprises suturing of a graft vessel model to the vessel model 300 (the host vessel model) in order to assess an integrity of the suturing.

Figure 25:
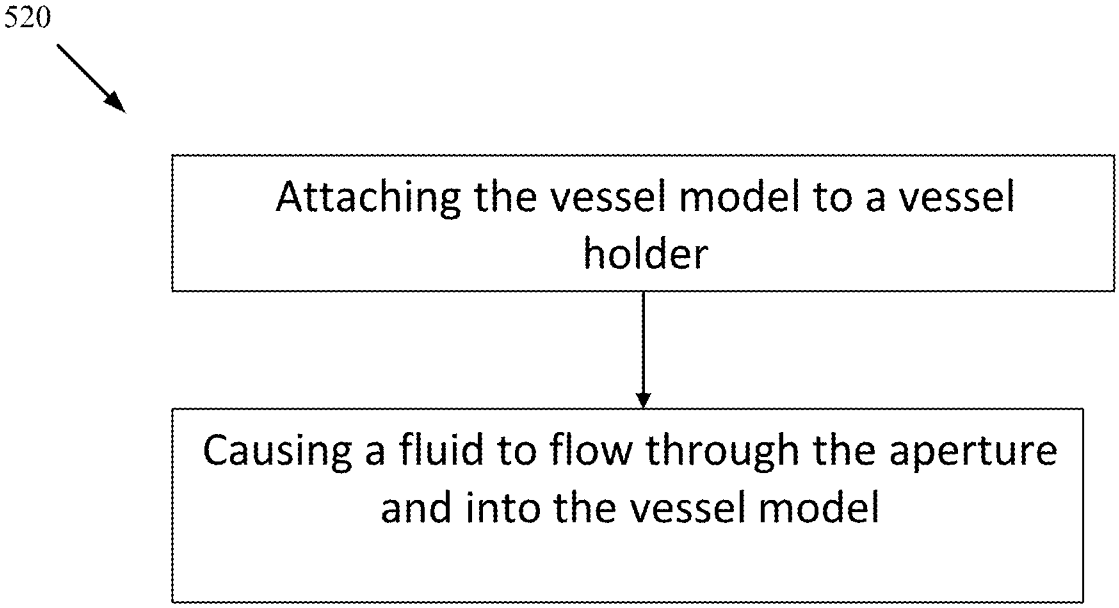
Figure 26:
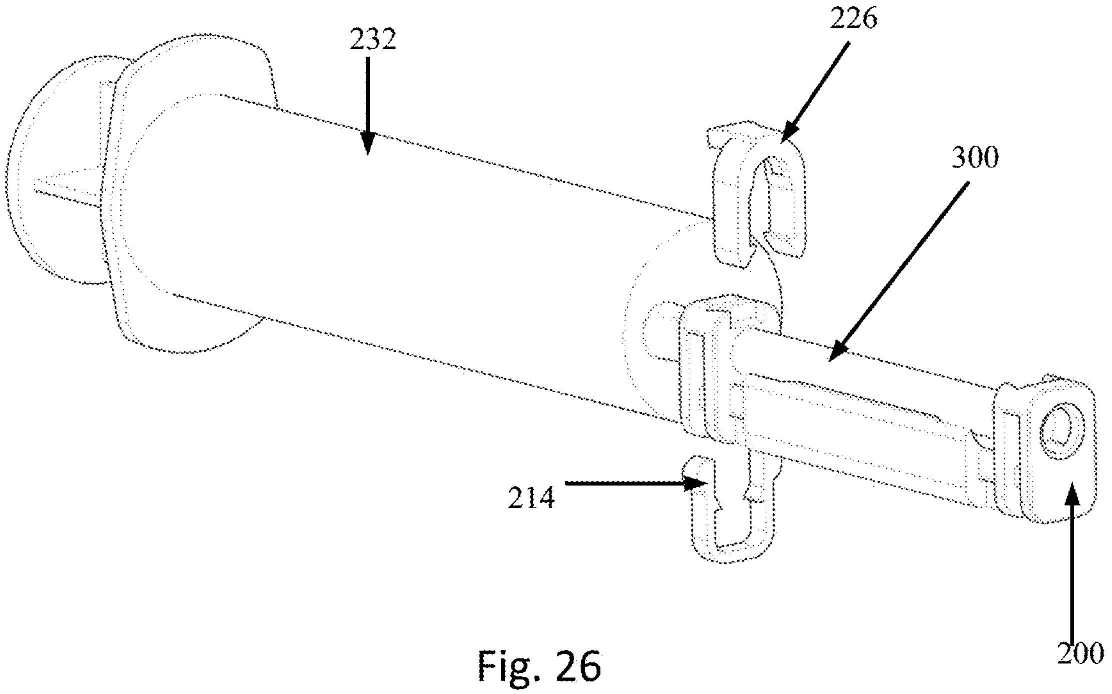
FIGS. 26 to 29 are perspective views of a vessel holder attached to a syringe, according to certain embodiments of the present technology.
Figure 27:
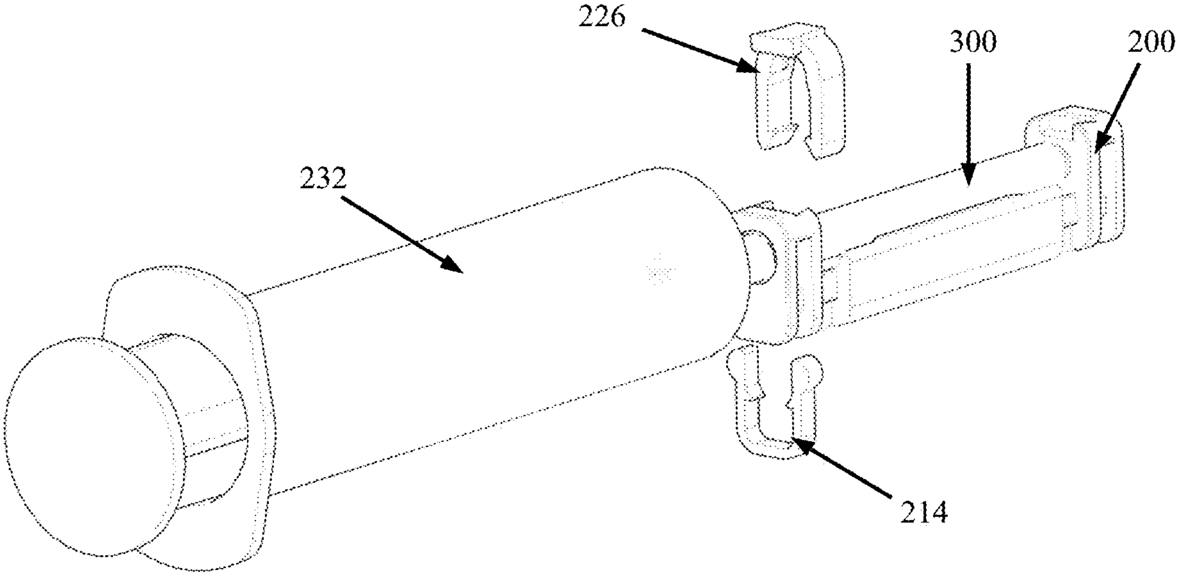
Figure 28:
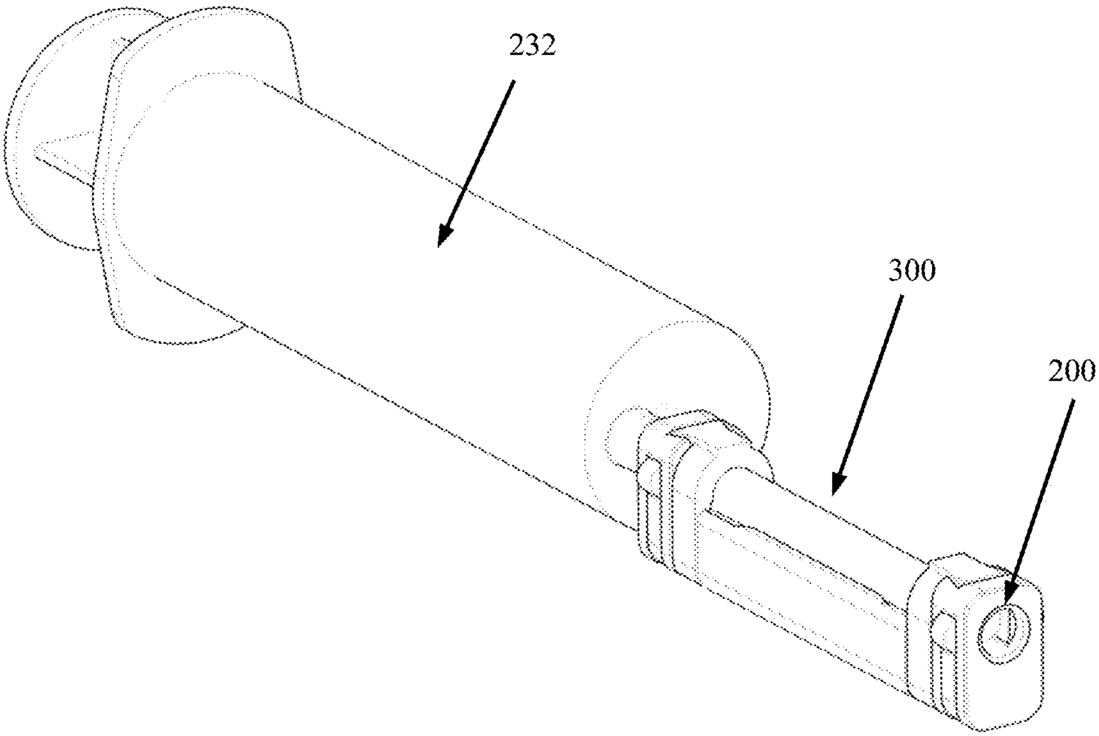
Figure 29:
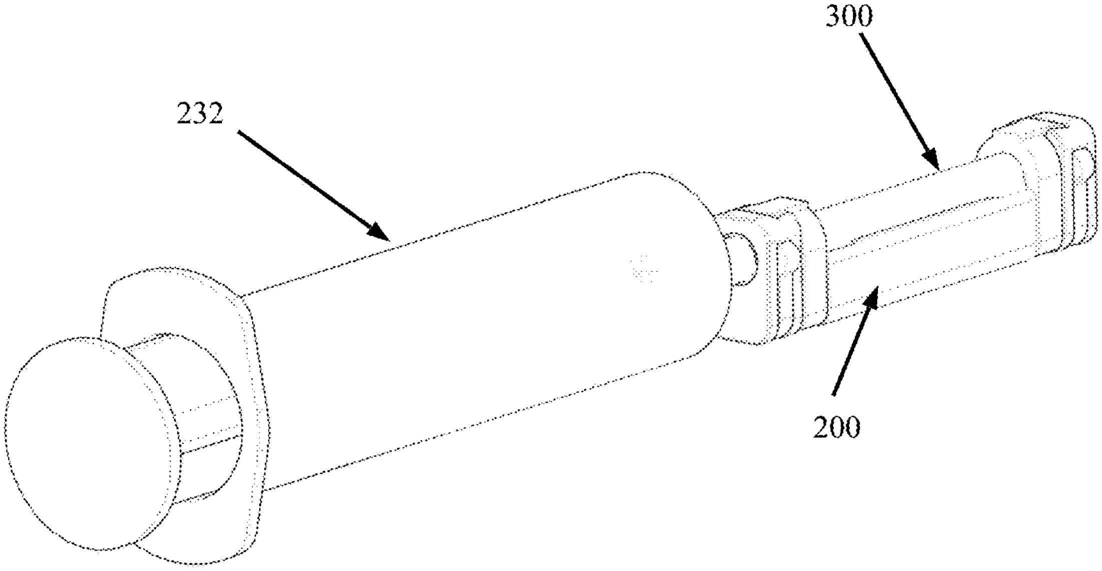

From another aspect, there is provided a method 520 (FIG. 25) of testing an integrity of the vessel model 300, the method 520 comprising: attaching the vessel model 300 to a vessel holder, such as the vessel holder 200, and causing a fluid to flow through the aperture 210 of the end walls 204 of the vessel holder 200 and into the vessel model 300.

In certain embodiments causing the fluid to flow through the aperture 210 comprises attaching a syringe 232 to the end wall 204 and pushing the fluid from the syringe 232 to the vessel model 300. This may be performed after the simulated surgery, or during the simulated surgery.

In certain embodiments, the method 520 further comprises collecting any fluid that has collected in the chamber 203 of the vessel holder to assess the integrity of the surgery, such as the suturing.

In certain embodiments in which the method 520 is performed after the surgical simulation, the vessel holder 200 is attached to a mount such as a laboratory stand and the fluid which is caused to flow into the vessel model 300 is a polymerizable material. In such embodiments, the method 520 further comprises: allowing the polymerizable material to polymerize to form a mold of an inner surface of the vessel model 300; and separating the polymerized material from the vessel model 300 for further testing. The further testing may comprise imaging a surface of the polymerized material. In embodiments in which the vessel model 300 comprises a host vessel model and a graft vessel model, the further testing comprises imaging a surface of the polymerized material at a junction of the host vessel model and the graft vessel model.

In certain embodiments, prior to causing the fluid to flow through the aperture 210 and into the vessel model 300, the method 520 comprises eliminating any air bubbles and/or evacuating gas from the vessel model 300.

Vessel Models

Figure 30:
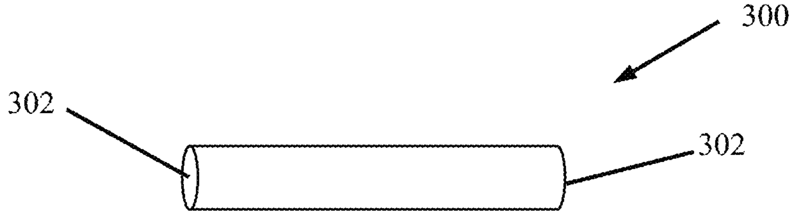
FIG. 30 is a side view of a vessel model, according to certain embodiments of the present technology.

As seen in FIG. 30, in some embodiments, the vessel model 300 generally simulates, in three-dimensions, a vessel on which the simulated surgery is to be performed on or around. The vessel model 300 may simulate any hollow or partially hollow body part. In some embodiments, the vessel model 300 is connectable directly to the 3D base 100. The vessel model 300 may be used for practicing surgical skills such as suturing and/or as an obstruction at the surgical site for accessing another part of the anatomy such as an organ. When the vessel model 300 is simulating a blood vessel (such as an artery or a vein), each vessel model 300 has a generally cylindrical configuration with an internal diameter and wall thickness that imitates the physiological vessels. The vessel model 300 has the open ends 302.

Vessels which can be simulated by different vessel models 300 comprise, without limitation, blood vessels such as arterial and/or venous blood vessels (arteries and veins such as the aorta), nerves, connective tissue, and the like. Also, in some non-limiting embodiments of the present technology, the vessel model 300 can further include various layers of the vessel anatomy, such as tunica intimae, tunica media, tunica adventitia, further including a fatty tissue extending around the vessel. Further, in some non-limiting embodiments of the present technology, the vessel model 300 can further be indicative of a variable thickness of the given vessel as well as of a number of branches thereof.

In the case of the vessel models 300 duplicating blood vessels, their diameters can range from about 1 mm to about 8 mm. According to certain non-limiting embodiments of the present technology, a wall thickness of the vessel model 300, depending on a particular vessel, can be selected from a wall thickness range from around 0.50±0.15 mm.

In other embodiments, the vessel model 300 may be configured to simulate a body part, other than a blood vessel, such as an organ or a soft tissue. Examples include one or more of the bladder, bowel, at least a part of the lymphatic system, and at least a part of the gastrointestinal system such as the stomach or intestines. In this respect, the vessel model 300 may have any shape appropriate to the body part that it is simulating. The vessel model 300 may be hollow so that if the surgical skill being performed is suturing, an intactness of the suturing can be tested.

The vessel models 300 may be made of any suitable material or combination of materials that can imitate mechanical properties of living vessels, such as but not limited to polyurethane, silicone, etc., having a hardness value of 10-25 according to Shore A scale, as an example.

The vessel model 300 may be connected to the 3D base 100 using a vessel model connector 600 which will be explained below with reference to FIGS. 14-23.

Vessel Model Connector

Figure 14:
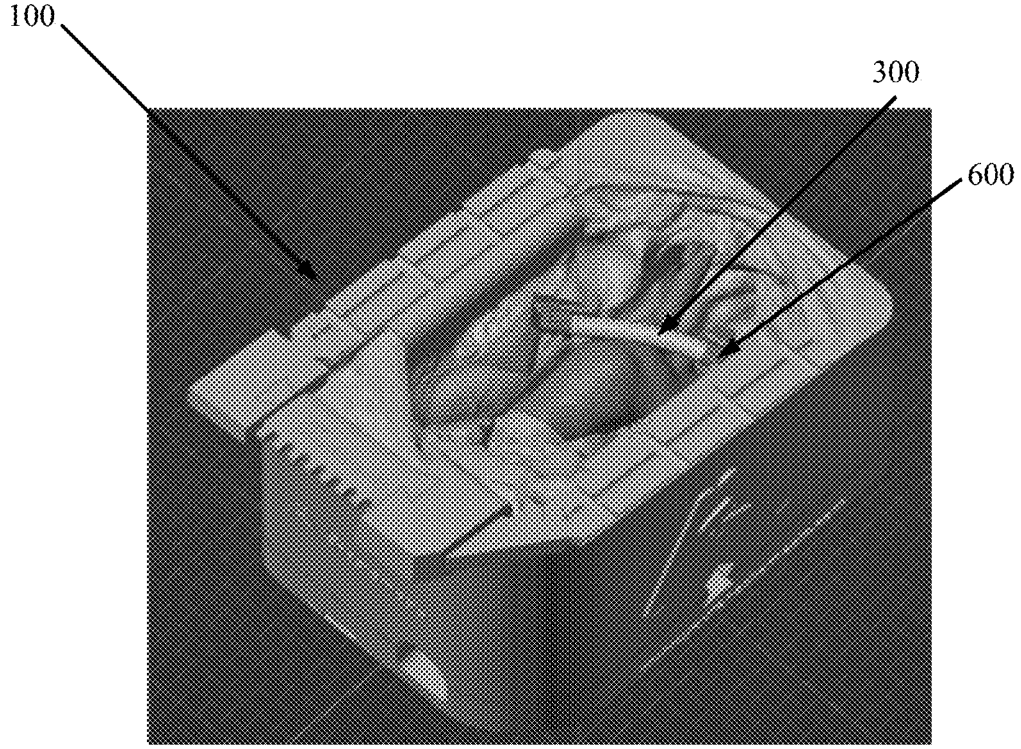
FIG. 14 is a 3D base simulating an anatomical scenario and including a vessel model attached to the 3D base by a vessel model connector, according to certain embodiments of the present technology.

As shown in FIG. 14, the vessel model 300 may be connected to the 3D base 100 using the vessel connector model 600. The vessel model connector may have any suitable configuration for removably attaching the vessel model 300 to the 3D base 100. In this respect, in some embodiments, the vessel model connector 600 has two parts that can detachably attach together: a vessel part 602 that is configured to connected to the open end 302 of the vessel model 300, and a base part 604 that is configured to connect to the 3D base 100.

Figure 15:
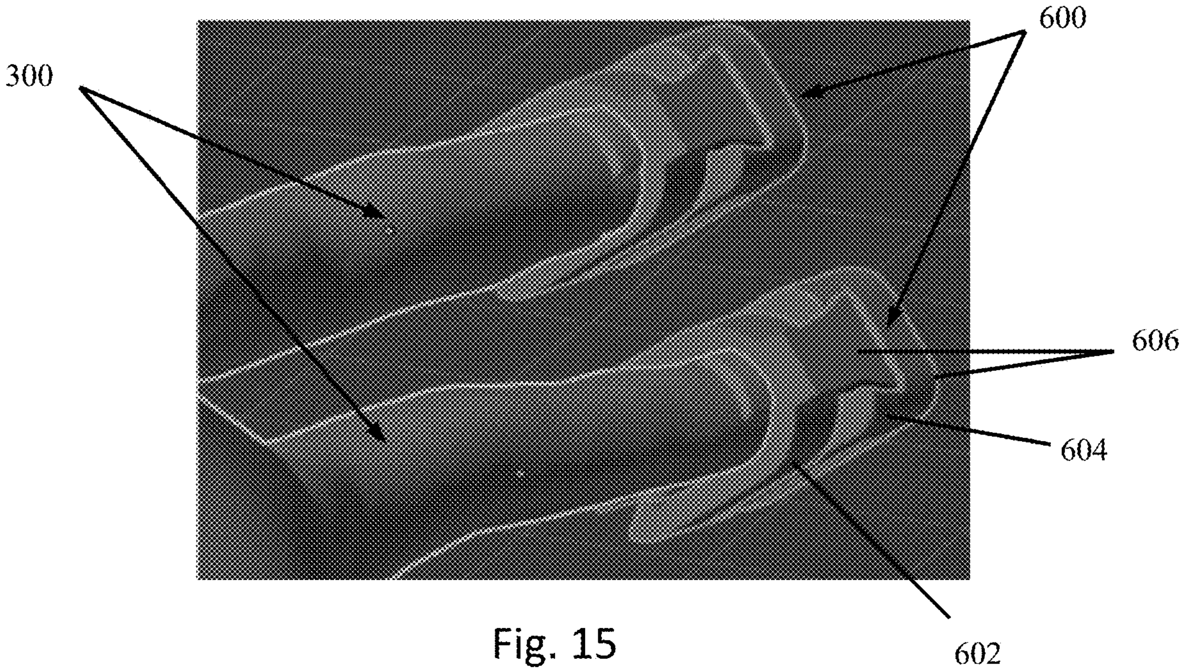
FIG. 15 is a close-up view of vessel model connectors connected to respective vessel models, according to certain embodiments of the present technology.

In the embodiment of the vessel connector 600 of FIG. 15, the vessel and base parts 602, 604 of the vessel model connector 600 have ends 606 that can slidably engage to connect to one another. One of the ends 606 may have a dovetail configuration so that they can only be disengaged by a sliding movement in one direction. In the embodiments in which the 3D base 100 has the anatomical scenario defined in the upper surface 106, the vessel and base parts 602, 604 of the vessel model connector 600 can be engaged and disengaged by sliding the vessel part 602 towards and away from the user when the user is standing over the 3D base 100 (e.g. sliding along a vertical plane).

Figure 16:
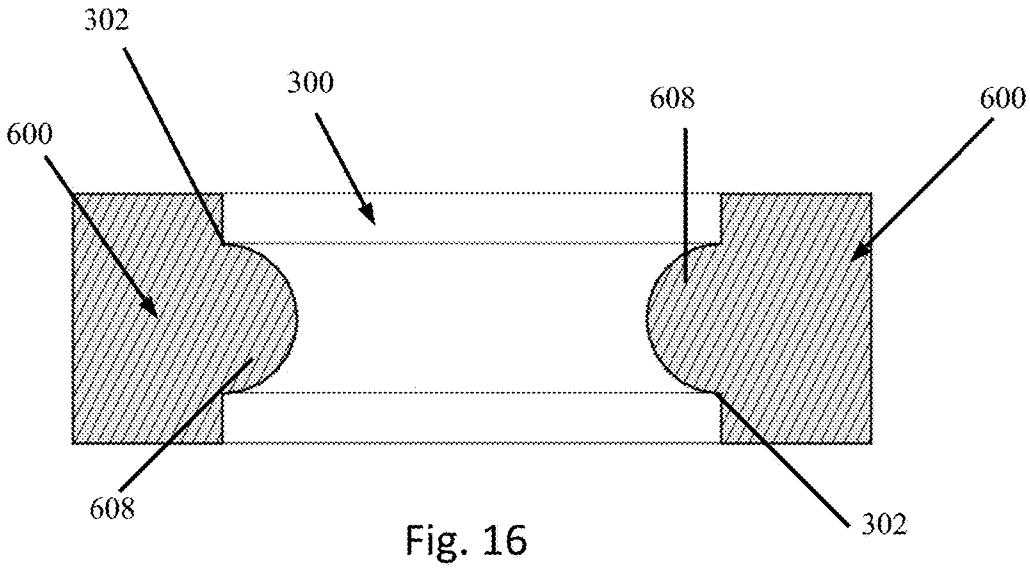
FIG. 16 is a longitudinal cross-sectional view through a vessel model including another embodiment of the vessel model connector of FIG. 14 which includes a stud, according to certain embodiments of the present technology.

Another embodiment of the vessel model connector 600 is shown in FIG. 16, in which the vessel connector 600 includes a stud 608 extending from a body 610 which is configured to detachably engage with the vessel model 300. The body 610 may be fixedly or detachably attached to the 3D base 100 which is not shown in FIG. 16. The vessel model 300 has two vessel model connectors 600 connected thereto, one vessel model connector 600 attached to each open end 302. More specifically, the stud 608 of the respective vessel model connector 600 is received in the respective open end 302 of the vessel model 300. The stud 608 is sized and shaped to be retained in the open end 302 of the vessel model 300 during use. Suitable choice of materials for both the vessel model 300 and the stud 608 can help to retain the connection-therebetween by friction. The vessel model connector 600 may be made of silicone, for example. The vessel model 300 is depicted as having a hollow cylindrical configuration.

However, in other embodiments (not shown), instead of the vessel model 300 being hollow throughout, the vessel model 300 may be generally solid yet having the open ends 302, the open ends 302 having an internal profile that corresponds to an external profile of the stud 608.

Figure 17:
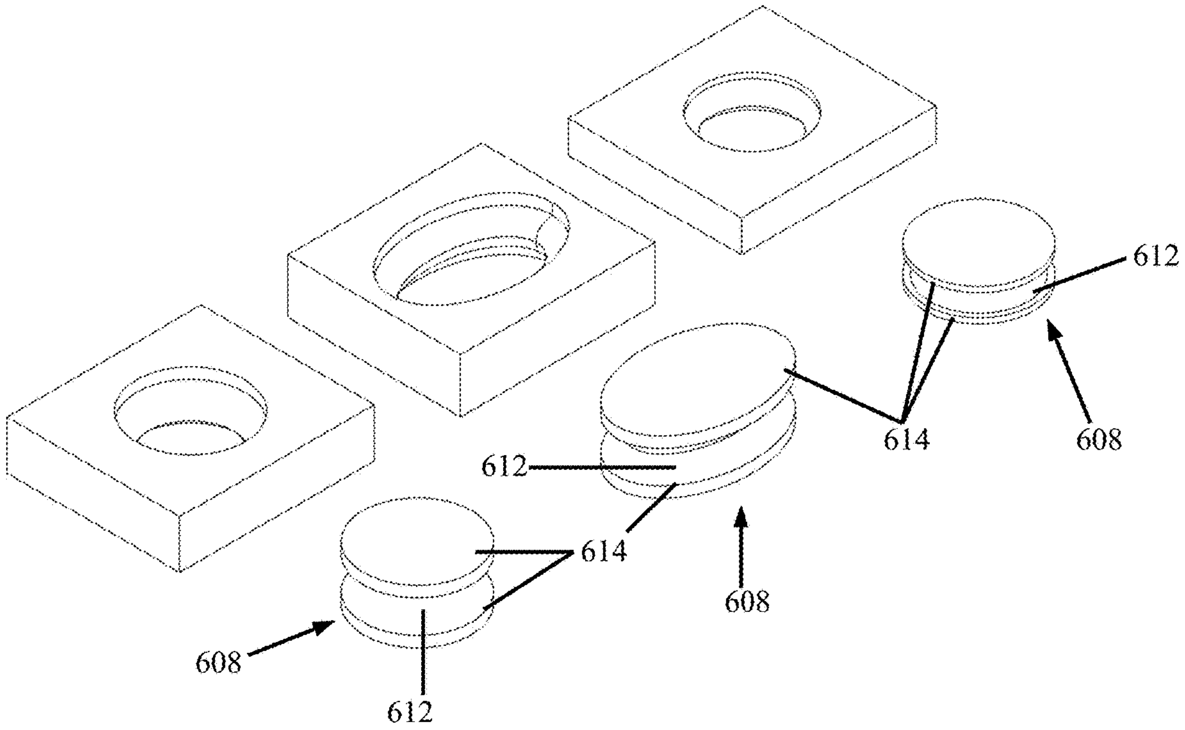
FIG. 17 depicts schematic illustrations of different stud configurations of the vessel model connector of FIG. 16.
Figure 18:
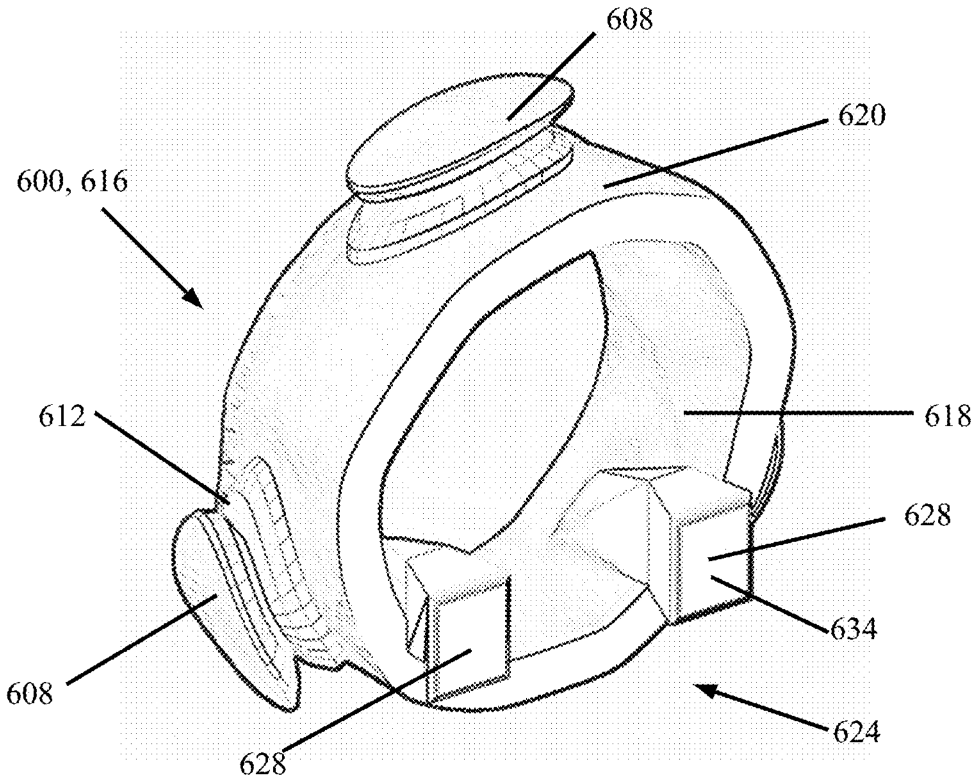
FIG. 18 is another embodiment of the vessel model connector of FIG. 15, when viewed from a base end, according to certain embodiments of the present technology.

The configuration of the external profile of the stud 68 and the internal profile of the open end 302 of the vessel model 300 may vary from that illustrated in FIG. 16. FIG. 17 shows different example profiles. The stud 608 may be hourglass shaped, having a narrower waist 612 than ends 614. Ends 614 of the stud may be curved or flat. The internal profile of the vessel model 300 or any other opening in which the stud 608 can be received, may have one or more lips which can engage with the waist 612 of the stud 608. The stud 608 may be attached directly to the 3D base 100, or indirectly as will be explained below with reference to FIGS. 18-23.

Figure 20:
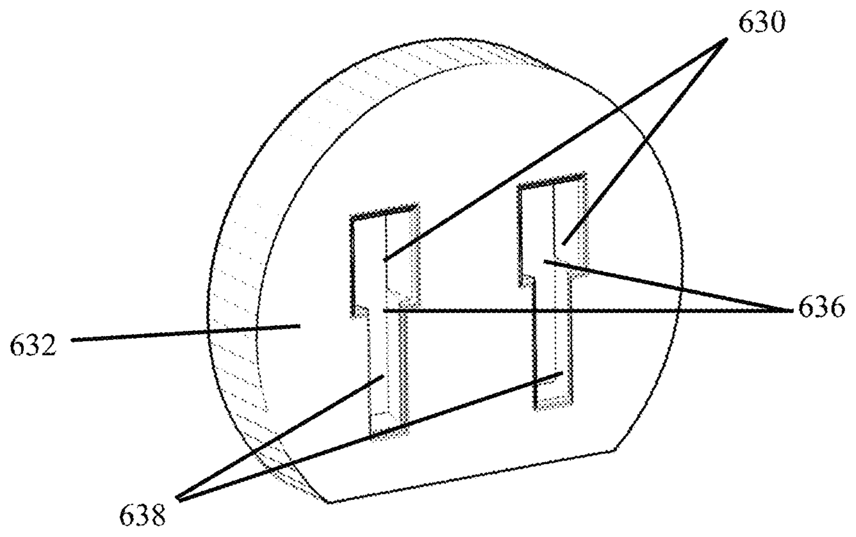
FIG. 20 is a portion of the 3D base to which the vessel model connector of FIG. 18 can detachably attach, according to certain embodiments of the present technology.
Figure 21:
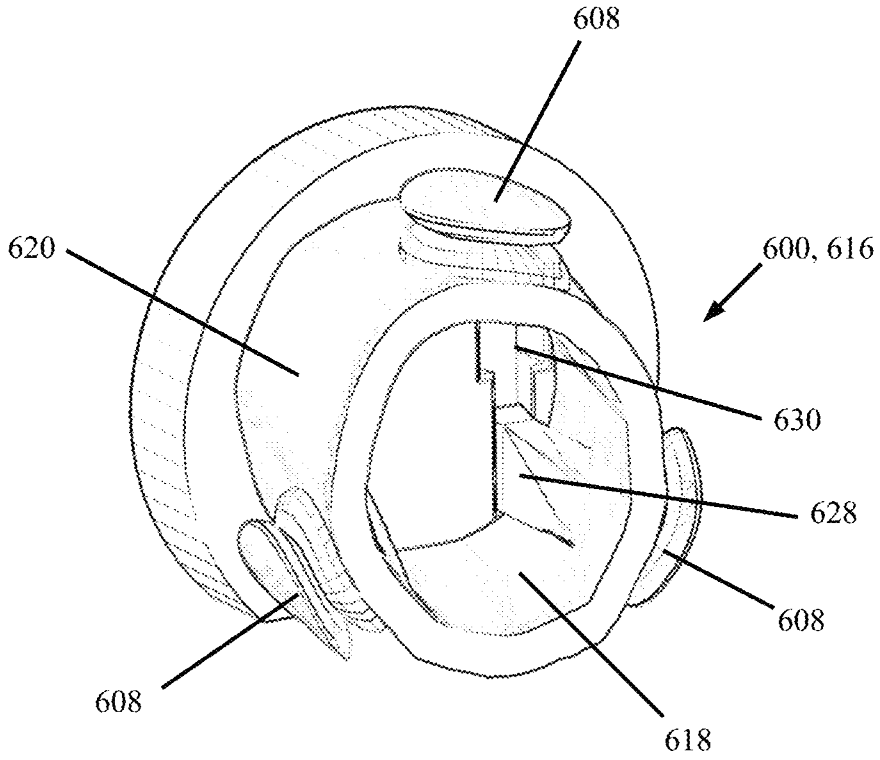
FIG. 21 shows the vessel model connector of FIG. 18 when connected to the portion of the 3D base of FIG. 20 and viewed from the vessel end, according to certain embodiments of the present technology.
Figure 22:
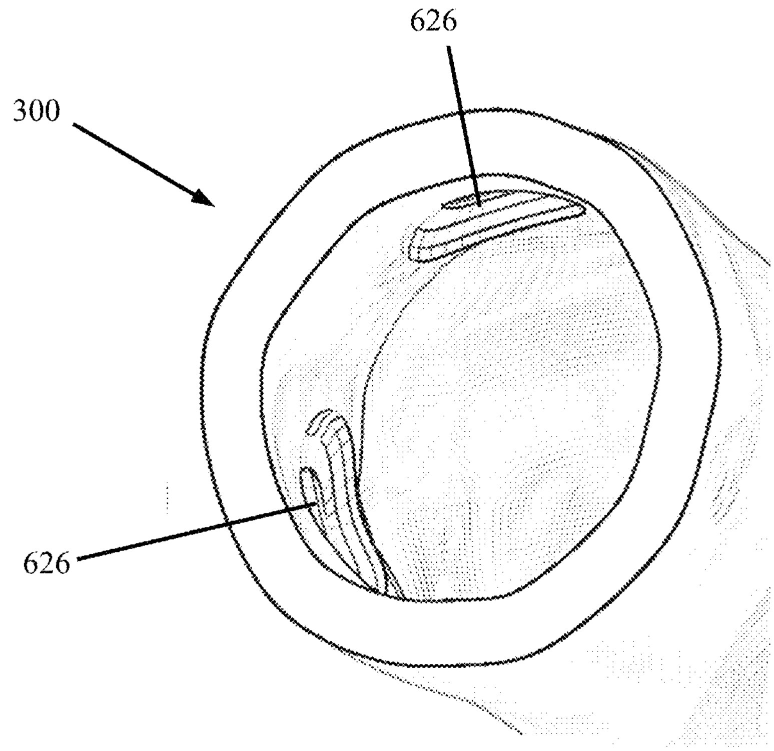
FIG. 22 shows an open end of the vessel model including stud openings for receiving the studs of the vessel model connector of FIG. 18, according to certain embodiments of the present technology.
Figure 23:
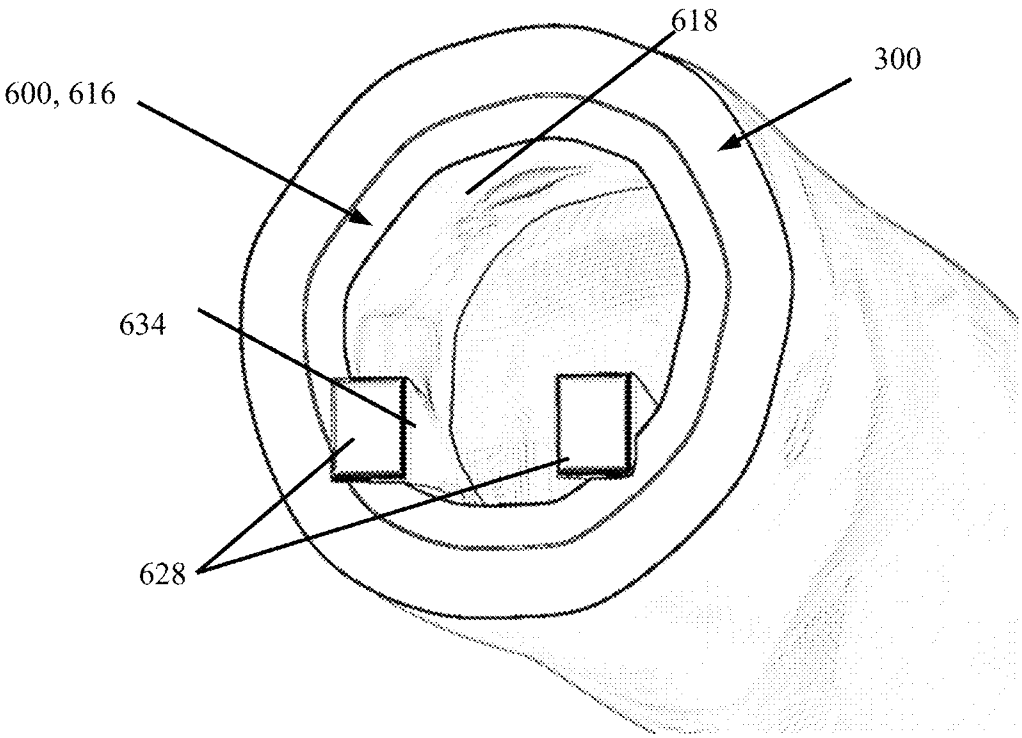
FIG. 23 shows the open end of the vessel model of FIG. 22 with the vessel connector received therein, according to certain embodiments of the present technology.

FIGS. 18-23 illustrate a further embodiment of the vessel model connector 600, in which the vessel model connector 600 comprises a ring 616 having an internal surface 618 and an external surface 620. Three studs 608 extend from the external surface 620 of the ring 616 and are circumferentially spaced from one another. The number of studs 608 may be more than or less than three. The ring 616 is configured to attach the vessel model 300 to the 3D base 100 by the studs 608. The ring 616 has a vessel end 622 and a base end 624. As best seen in FIGS. 22 and 23, the vessel end 622 of the ring 616 is configured to be received in the open end 302 of the vessel model 300 and each stud 608 is configured to be received in, and at least partially extend through, a respective stud opening 626 defined in a wall of the vessel model 300. In this respect, the end 614 of the stud 608 that is visible through the stud opening 626 may be shaped to match a profile of the vessel model 300 to create a seamless appearance.

The configuration of the studs 608 and the stud openings 626 may correspond to those illustrated in FIG. 17. When connected, a longitudinal axis of each stud 608 extends radially relative to the vessel model 300.

Figure 19:
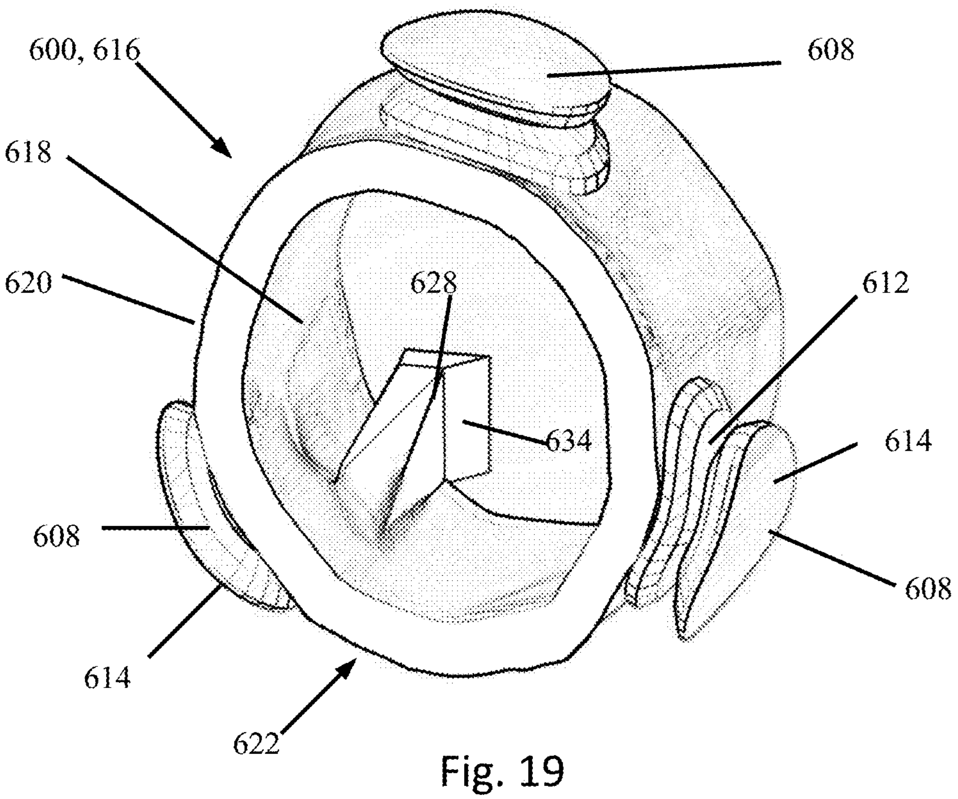
FIG. 19 is the vessel model connector of FIG. 18, when viewed from a vessel end, according to certain embodiments of the present technology.

The internal surface 618 of the ring 616 comprises two protrusions 628 extending axially from the internal surface 618 and beyond the base end 624. There may be more than or less than the two protrusions 628. Each protrusion 628 is configured to be received in a corresponding slot 630 in the 3D base 100 (FIG. 20) to detachably attach the ring 616 to the 3D base 100. The slot 630 may be formed directly in the 3D base 100 or on a separate component 632, such as a disk, which is attached to the 3D base 100. As best seen in FIGS. 19-21, each protrusion 628 has a flared end 634, and each slot 630 has a first portion 636 through which the flared end 628 can be inserted and slid to a second portion 638 which retains the protrusion 628 and prevents its separation from the component 632 in a direction orthogonal to a longitudinal axis of the slot 630. When the protrusions 628 are received in the slots 630 and the studs 608 are received in the stud openings 626 of the vessel model 300, the ring 616 is obscured from view by the user, thereby presenting a seamless detachable attachment of the vessel model 300 to the base 100. It will be appreciated that the stud openings 626 may be formed in the ring 616 instead of being defined in the vessel model 300, and the stud 608 could extend from the vessel model 300. Similarly, the protrusions 628 could be formed in the 3D base 100 or the component 632 and the slots 630 could be formed in the ring 616.

Fatty Vessel Models

Figure 31:
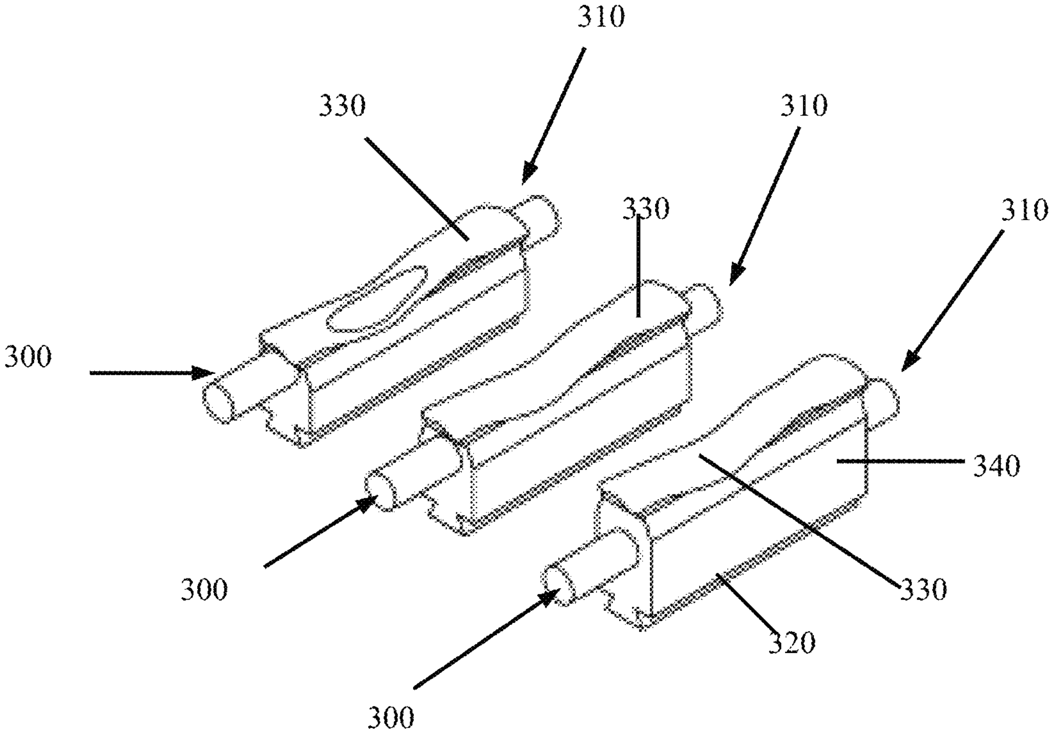
FIG. 31 are perspective views of fatty vessel models, according to certain embodiments of the present technology.

Referring to FIG. 31, in certain aspects, there are provided fatty vessel models 310 which comprise a vessel model, such as the vessel model 200, a vessel support 320, and a vessel covering 330 which in certain embodiments simulates a fatty-like deposit. As best seen in FIG. 31, the fatty vessel models 310 may simulate different physiological scenarios in which, for example, a blood vessel has different thicknesses of fatty-like deposit therearound, representing different severities of fatty tissue. For example, the fatty vessel models A, B and C in FIG. 31 have respectively increasing fatty-like deposit thicknesses. In real-life surgery, epicardial fat that covers blood vessels may cause complications during surgery such as in attaching a graft vessel to the fatty-covered vessel, and therefore simulating this scenario can provide a useful training aid.

The vessel support 320 has a free end that is shaped for attachment to the 3D base 100. In the embodiment of FIG.

31, the free end of the vessel base 320 is dove-tail shaped and is configured to be received in a complimentary channel in the 3D base or in the vessel holder. The vessel support 320 may be made of any appropriate material such as polyethylene. The vessel support 320 may be 3D printed, molded or made in any other suitable manner.

The vessel covering 330 comprises a material made of a polymeric material simulating fatty tissue. In certain embodiments, the material used to make the vessel covering 330 comprises a foaming polyurethane.

In certain embodiments, the fatty vessel model 310 further comprises a soft tissue layer 340 in between the vessel support 320 and the vessel model 200. The soft tissue layer 340 may simulate an epicardium, a myocardium, or an endocardium tissue of a heart, and have mechanical properties similar to those of the soft tissue which it is simulating in order to simulate the haptic experience of cutting into muscle. In certain other embodiments, the soft tissue layer 340 may be omitted. In certain embodiments, the soft tissue layer 340 is made of silicone.

In a specific non-limiting example, the silicone can be a Rebound™ 25 silicone available from Smooth-On, Inc. of 5600 Lower Macungie Road Macungie, Pennsylvania 18062. In this example, to obtain the desired properties of the soft tissue layer 340, the following instructions should be followed: (i) mix portion A and portion B of the silicon in 1:1 ratio to obtain a polymer precursor; (ii) pour the so obtained polymer precursor into a mold (such as the mold 350 depicted in FIGS. 32 and 33); and (ii) allow the polymer precursor to polymerize in the mold for around six hours at a temperature of around 23 degrees Celsius or for around two hours at a temperature of around 60 degrees Celsius. After polymerization, the obtained soft tissue layer 340 will have the following properties: a hardness value of 25 according to the Shore A scale; a specific gravity value of around 1.14 g/cc; a specific volume value of around 23.5 cu. in./lb; a tensile strength value of around 515 psi; an elongation at break value of around 690%; a Die B tear strength value of around 102 pli; a shrinkage value of less than 0.001 in./in; and brushable mixed viscosity. It should be expressly understood that other materials capable of providing the same or similar properties to the soft tissue layer 340 can be used without departing from the scope of the present technology. For example the material may comprise another silicone or any other type of polymer.

The vessel model 200 may be attached to the soft tissue layer 340, or be resting thereon.

In certain embodiments, the vessel model 200 may extend at an angle relative to the vessel support 320. In certain embodiments, the vessel covering 330 may not have an even thickness across all parts of the vessel model 200.

Figure 32:
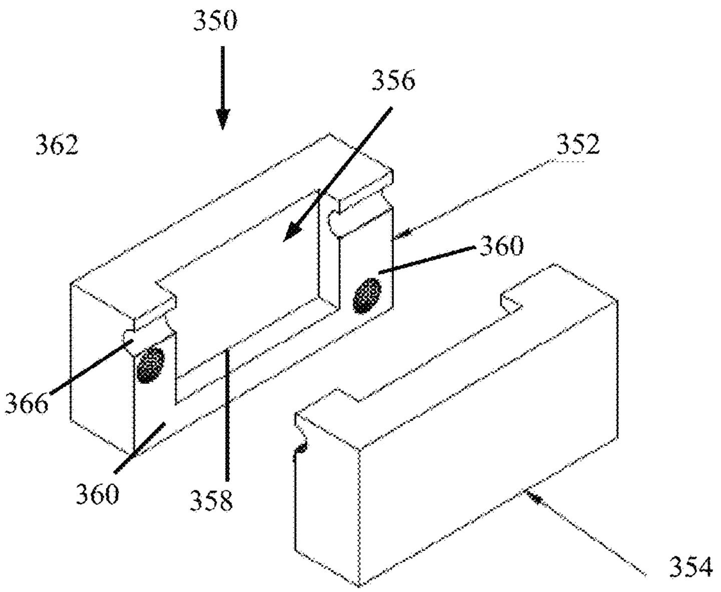
FIGS. 32 and 33 are exploded perspective and perspective views, respectively, of a mold for making a fatty vessel model, according to certain embodiments of the present technology.
Figure 33:
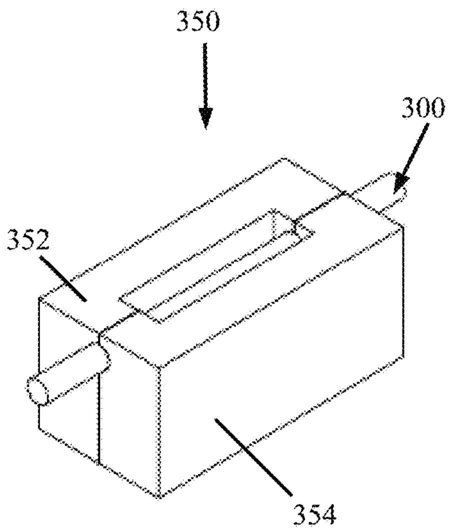

In certain embodiments, the fatty vessel model 310 is constructed using a mold. Referring to FIGS. 32 and 33, there is provided the mold 350 for producing the fatty vessel model 310. The mold comprises two mold components 352, 354 which, when assembled, define a chamber 356 configured to accommodate therein the vessel support 320. In embodiments in which the fatty vessel model 310 includes the soft tissue layer 340, the chamber 356 is configured to accommodate therein the vessel support 320 and the soft tissue layer 340. The chamber 356 has an open top face and is defined by a base wall 358, a pair of side walls 360, a front wall 362 and a back wall 364. The front wall 362 is in the mold component 352 and the back wall 364 is in the mold component 354. A channel 366 is provided which extends laterally across each one of the pair of side walls 360. The channel 366 is configured to receive the vessel model 200 so that the vessel model 200 extends between the pair of side walls 360. The two mold components 352, 354 are configured to be removably connected together, in a side-by-side configuration.

In certain embodiments, the mold 350 is sized such that when the mold 350 receives the vessel support 320, which optionally includes the soft tissue layer 340 thereon, and the vessel model 200 is positioned in the channel 366, an upper surface of the vessel support 320 is spaced from the vessel model 200 to permit the vessel covering 330 to be applied around the vessel model 200. In other embodiments, the mold 350 is sized such that when the mold 350 receives the vessel support 320, which optionally includes the soft tissue layer 340 thereon, and the vessel model 200 is positioned in the channel 366, the vessel model 200 rests on the vessel support 320 (or the soft tissue layer 340 if present) such that the vessel covering 330 does not cover an entire circumference of the vessel model 200.

A height of the channel 366 from the open top face of the chamber 356 is selected based on a desired thickness of the vessel covering 330 around the vessel model 200. The desired thickness can be one of a plurality of predetermined thickness values, each one of the plurality of thickness values being associated with a respective one of a plurality of complexity levels of a given surgical scenario to be reproduced using the vessel model 200 with the vessel covering 330 thereon.

In certain embodiments, when the two mold components 353, 354 are assembled, each one of the chamber 356 and the channel 366 of the mold 350 is symmetrical relative to a common symmetry plane. In other embodiments, the mold components 353, 354 may be configured to present the vessel model 200 at an angle relative to the vessel support 320. The mold components 352, 354 may be 3D printed.

In certain embodiments, there are provided a set of such molds 350 which differ from each other in that they have different height values of respective channels 366 from the open top faces of respective chambers thereof so that they produce fatty vessel models 300 with different thicknesses of the vessel covering 330 thereon.

From another aspect, there is provided a method of making the fatty vessel model 300 comprising: obtaining the vessel model 200, obtaining the vessel support 320, obtaining the mold component 352 of the mold 350, placing the vessel support 320 on the base wall 358, placing the vessel model 200 in the channel 366 such that the vessel model 200 extends between the pair of side walls 360, connecting the mold component 354 to the mold component 352, placing the vessel covering 330 through the open top face onto the vessel model 200, separating the two mold components 352, 354 and removing the thus formed fatty vessel model 310.

In certain embodiments, the vessel covering 330 is made of a polymeric material, and the placing the vessel covering 330 comprises placing a precursor vessel covering material on the vessel model 200 in a pre-polymerized state, and permitting polymerization of the precursor vessel covering material to occur.

Figure 34:
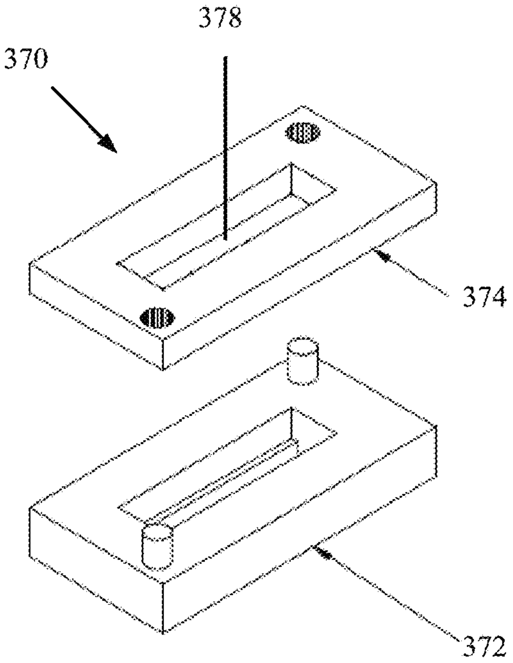
FIGS. 34 and 35 are exploded perspective and perspective views, respectively, of a mold for making a vessel support including optionally a soft tissue layer, according to certain embodiments of the present technology.
Figure 35:
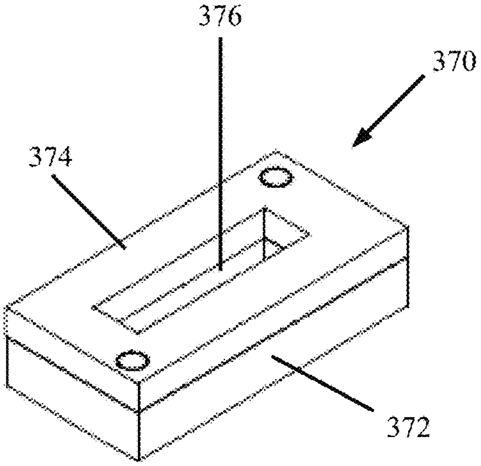
Figure 36:
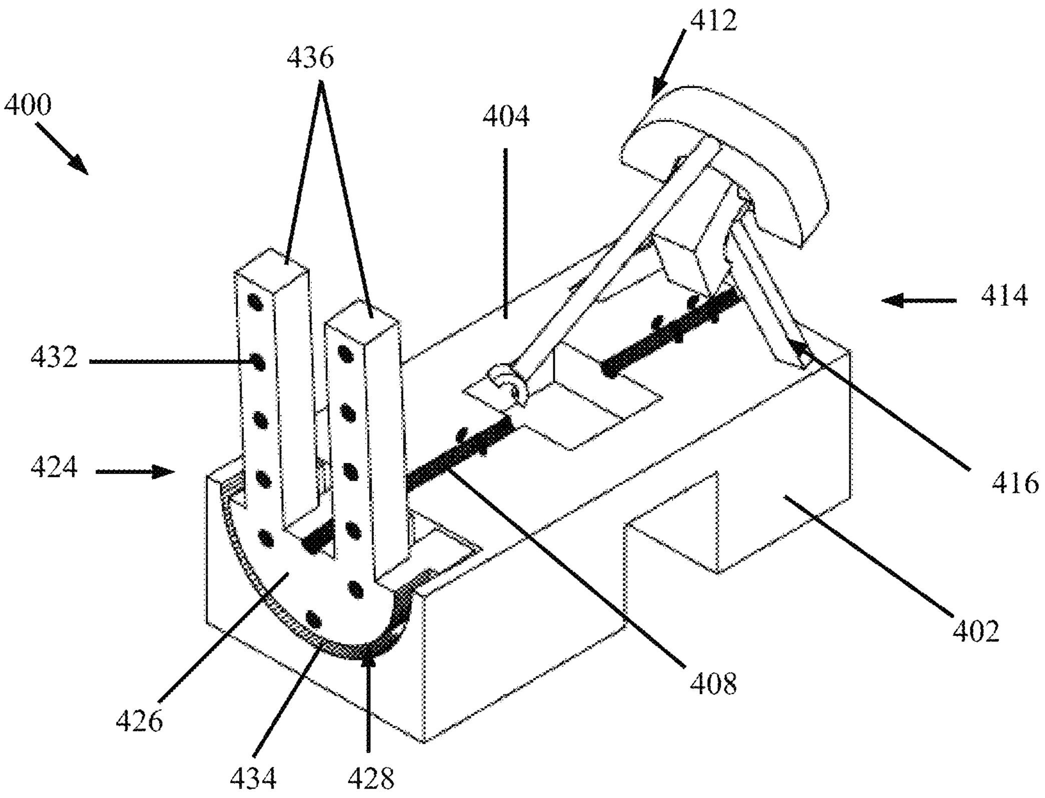
FIGS. 36 to 41 are various views of a positioner, according to certain embodiments of the present technology.
Figure 37:
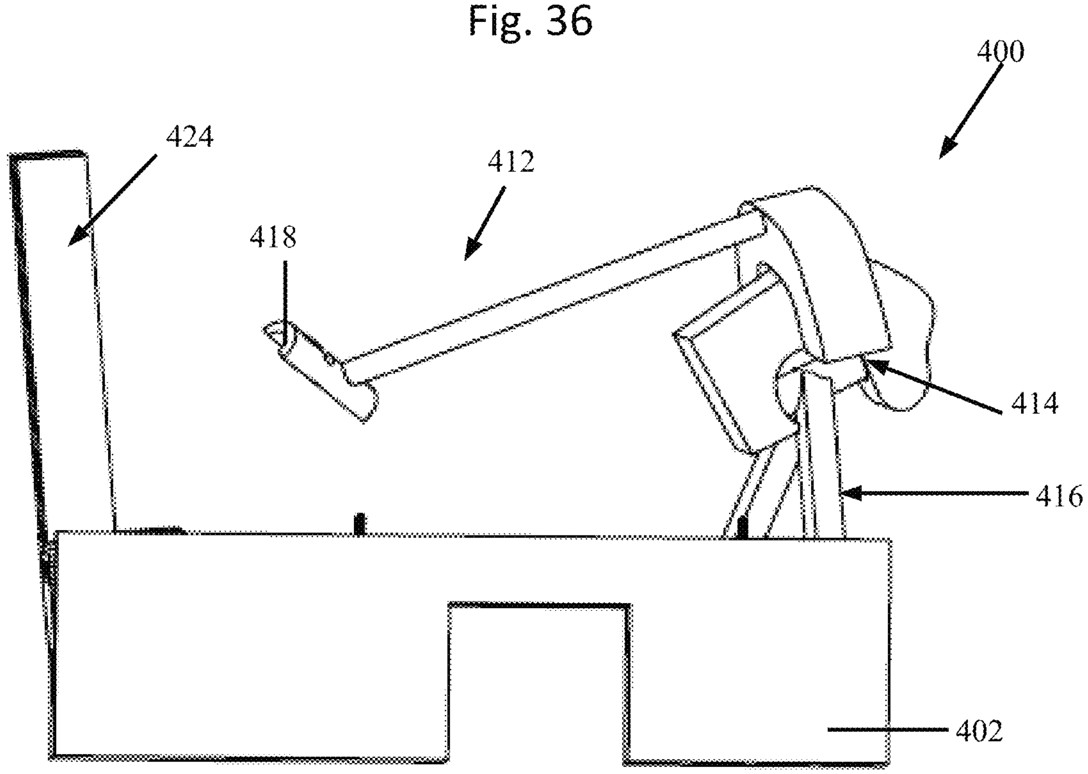
Figure 38:
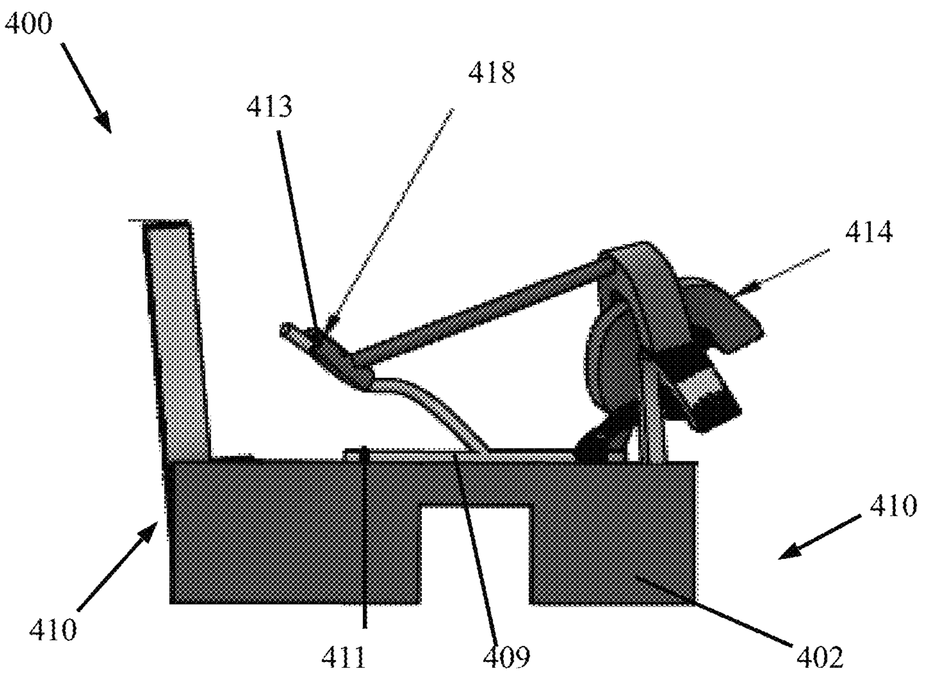
Figure 39:
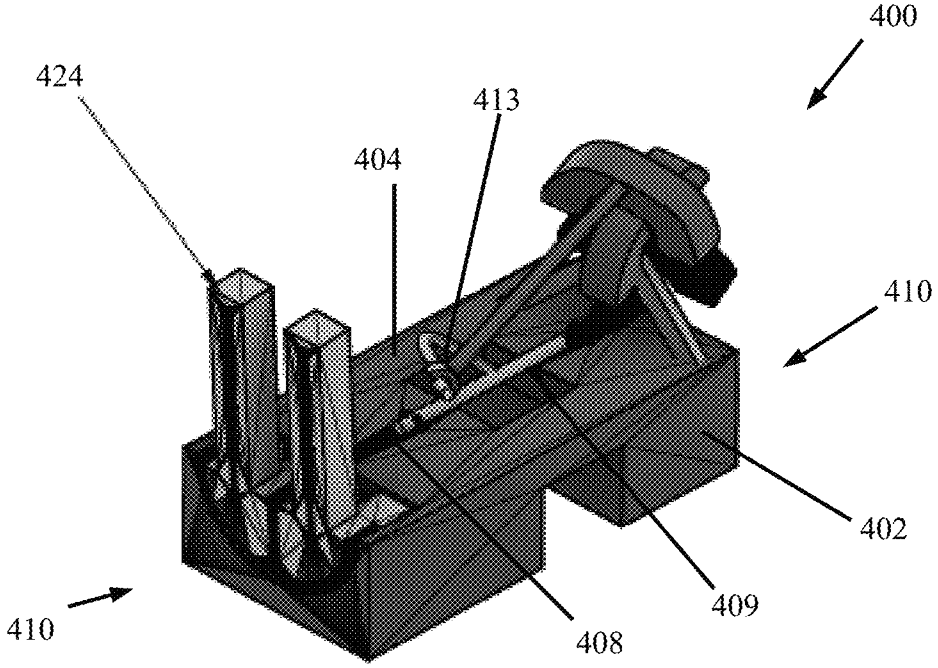
Figure 40:
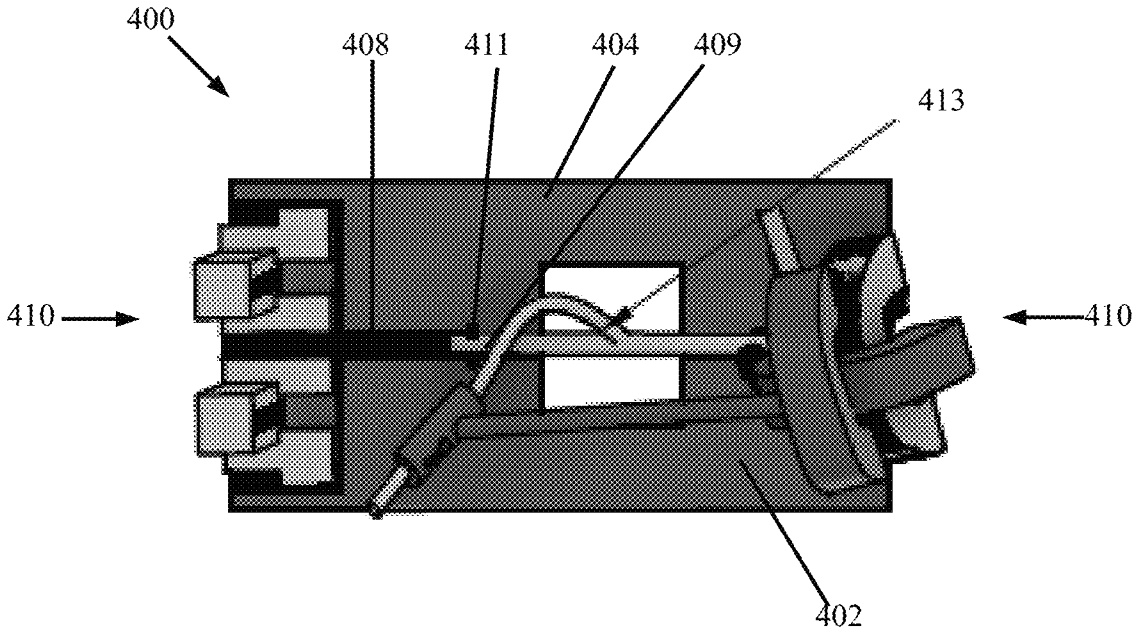
Figure 41:
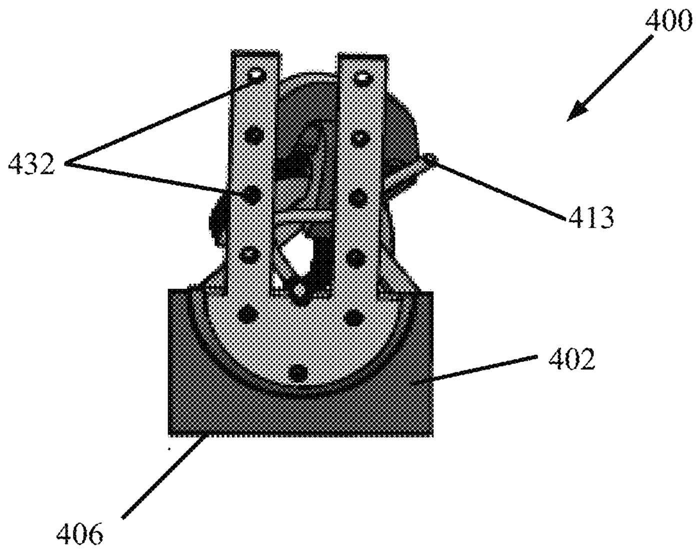

Referring to FIGS. 34 and 35, there may be provided a mold 370 for producing the vessel support 320 with the soft tissue layer 340. The mold 370 comprises a lower component 372 and an upper component 374. The lower component 372 and the upper component 374 are configured to be removably connected together. The lower component 372 defines a chamber 376 shaped to receive the vessel support 320. A shape of the inner face of the lower component 372 is configured to produce the dovetail shape in certain embodiments. The upper component has an opening 378 formed therethrough that fluidly communicates with the chamber 376 when the lower component 372 and the upper component 374 are connected. The lower component 372 and the upper component 374 may be 3D printed.

In certain embodiments, a method of making the vessel support 320 with the soft tissue layer 340 thereon comprises placing the vessel support 320 in the lower component 372. The vessel support 320 may be placed in the chamber 376 of the lower component 372 in a pre-polymerized state and polymerized in situ, in certain embodiments. Then the upper component 374 is positioned on the lower component 372. Finally, the soft tissue layer 340 is placed on the vessel support 320 through the opening 378. The soft tissue layer 340 may be placed in the opening 378 of the upper component 374 in a pre-polymerized state and polymerized in situ, in certain embodiments.

Positioner

Referring now to FIGS. 36-41, there are shown certain embodiments of the positioner 400. As stated above, the positioner 400 is for positioning two vessel models 300 relative to one another, such as a host vessel model and a graft vessel model, at desired relative positions. The positioner permits positioning of the vessel models in configurations simulating anatomical or surgical situations, such as vascular anastomosis (surgery to graft a graft vessel onto a host vessel). The positioner may be used to test a relative integrity of the anastomosis such as by recreating the relative surgical positions of the host vessel model and a graft vessel model and causing fluid to flow through one or both of the host vessel model and a graft vessel model to determine fluid leakage from the site of the anastomosis.

The positioner 400 comprises a base 402 including a top surface 404 and a bottom surface 406, the top surface 404 defining therein a vessel model channel 408 configured to accommodate therein a host vessel model 409, such as the vessel model 300. The vessel model channel 408 extends between two ends 410 of the base 402. Connectors 411 may be provided proximate the vessel model channel 408 for securing the vessel model 300 in position in the vessel model channel 408.

Proximate one end 410 of the base 402, there is provided an arm 412 extending upwardly from the base 402 and configured to be coupled to a graft vessel model 413, such as the vessel model 300, for manipulating a position thereof relative to the host vessel model 409.

The arm 412 is moveably attached to the base 402 by an arm joint 414 configured to provide to the arm 412 at least three degrees of freedom of movement. The arm joint 414 is spaced from the base 402 by a support portion 416. In certain embodiments, the arm joint 414 can permit a position of the graft vessel model 413 to be adjusted along x, y and z directions. More specifically, in certain embodiments, the arm joint 414 permits movement of the arm 412 in an x-y direction sweep parallel to the top surface 404 of the base 402. The arm joint 414 also permits the arm 412 to pivot up and down.

The arm 412 comprises a connector portion 418 configured to support the graft vessel model 413, the connector portion 418 having a profile configured to follow, at least partially, a surface of the graft vessel model 413. The connector portion 418, the arm joint 414, and the support portion 416 are disposed sequentially.

In use, the host vessel model 409 is received in the vessel model channel 408 with the graft vessel model 413 positioned on an upper portion thereof. The arm 412 is manipulated such that the arm joint 414 is positioned to permit the connector portion 418 to support the graft vessel model 413 at an angle and a distance reflecting the relative positions during attachment of the graft vessel model 413 to the host vessel model 409 during surgery/simulated surgery. In other words, the graft vessel model 413 is supported such that it is fully extended and with no bends or kinks therein.

Turning back to the base 402, the top surface 404 of the base 402 has a cavity 420 defined therein. The cavity 420 is defined around a portion of the vessel model channel 408. The cavity 420 may be defined in a substantially central portion of the base 402. In use, the host vessel model 409 is positioned in the vessel model channel 408 such that an attachment region 422 is positioned over the cavity so that any fluid leaking during testing is collected in the cavity 420. A removal leakage container (not shown) may be provided in the cavity 420.

In certain embodiments, instead of or in addition to the arm 412, there is provided a retainer 424, extending upwardly from the base 402 and configured to connect an end of the graft vessel model 413 thereto in a plurality of predetermined positions relative to the host vessel model 409.

The arm 412 and the retainer 424 are respectively disposed one at each end 410 of the vessel model channel 408. In certain embodiments, the connector portion 418 of the arm 412 extends towards the retainer 424.

The retainer 424 has a retainer body 426 connected to the base 402 by a retainer joint 428, the retainer joint 428 being configured to allow a rotation to the retainer body 426 about a joint axis 430 of the retainer joint 428, the retainer joint 428 connected to the base 402 so that the joint axis 430 extends along the vessel model channel 408.

The retainer body 426 defines positioning apertures 432 therein, the positioning apertures 432 arranged in an array to permit connection of the graft vessel model 413 to the retainer body 426 in the plurality of predetermined positions. A given one of the plurality of predetermined positions is associated with a respective height value from the top surface 404 of the base 402 and a respective lateral distance value from the vessel model channel 408.

The retainer joint 428 is received in an opening 434 in the base 402 extending below the top surface 404 thereof. The retainer joint 428 has a circular profile and the retainer body 426 has two arms 436, like prongs, that extend from the retainer joint 428. Positioning apertures 432 are defined in the two arms 436 as well as in the retainer joint 428. Some of the positioning apertures 432 are positioned such that when the retainer body 426 is in a neutral position, they are below the top surface 404 of the base 402; and when the retainer body 426 is rotated around the joint axis 430, they are above the top surface 404 of the base 402.

In use, the host vessel model 409 is placed in the vessel model channel 408, and the graft vessel model 413 is attached to the arm 412. The arm 412 is moved until the graft vessel model 413 is in a desired relative position to the host vessel model 409. An end of the graft vessel model 413 may be attached to the retainer 424. The integrity of the attachment of the graft vessel model 413 to the host vessel model 409 may then be tested by flushing fluid therethrough. In certain embodiments, the fluid is a polymerizable fluid, such as a polymer precursor. The testing may comprise causing the fluid to flow therethrough at a controlled pressure (e.g. 80 mm Hg) and flow rate and determining a volume or weight of fluid leakage during a predetermined test period (e.g. 30 seconds). A fraction of the leaked fluid may be used as a measure of the integrity of the suturing of the graft vessel model 413 to the host vessel model 409. The fraction of the leaked fluid may be determined after the fluid is polymerised.

It is to be understood that many of the features described with respect to different embodiments of the above components may be combined where they do not contradict one another.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It is to be understood that terms relating to the position and/or orientation of components such as "upper", "lower", "top", "bottom", "front", "rear", "left", "right", are used herein to simplify the description and are not intended to be limitative of the particular position/orientation of the components in use.

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future.

Modifications and improvements to the above-described implementations of the present technology may become apparent to those skilled in the art. The foregoing description is intended to be exemplary rather than limiting. The scope of the present technology is therefore not intended to be limited by specificities of the shown examples.

The invention claimed is:

1. A vessel holder for connecting thereto a vessel model, the vessel holder comprising:

an elongate body having a pair of end walls separated by a pair of side walls defining a chamber, each end wall having:

a holder-vessel connector configured to be connected with an open end of a vessel model to attach the vessel model to the vessel holder, the holder-vessel connector defining an aperture extending through the holder-vessel connector and a respective end wall for fluidly connecting the vessel model and the vessel holder; and at least one holder-mount connector for connecting the vessel holder to a mount.

2. The vessel holder of claim 1, wherein the side walls are disposed along a longitudinal direction of the elongate body.

3. The vessel holder of claim 1, wherein a diameter of the holder-vessel connector has been selected based on a diameter of the vessel model.

4. The vessel holder of claim 1, wherein the holder-mount connector is a male connector configured to be received into the open end of the vessel model, or the holder-vessel connector is a female connector configured to receive the open end of the vessel model.

5. The vessel holder of claim 1, wherein the at least one holder-mount connector is configured to be received in a corresponding holder-mount aperture defined in at least one end wall of the elongate body.

6. The vessel holder of claim 5, wherein the holder-mount aperture extends along a bottom edge of the at least one end wall of the elongate body and at least partially along side edges of the at least one side wall.

7. The vessel holder of claim 6, wherein the holder-mount connector is shaped such that when the holder-mount connector is received in the holder-mount aperture of the at least one end wall, the holder-mount connector extends at least partially around the at least one end wall.

8. The vessel of claim 1, wherein the holder-mount connector is U-shaped and has two arms, each arm having a free end.

9. The vessel holder of claim 1, wherein at least a portion of the holder-mount connector is less rigid and/or more resilient than the elongate body of the vessel holder.

10. The vessel holder of claim 1, wherein the at least one holder-mount connector is configured to connect the vessel holder to a plurality of different mounts.

11. The vessel holder of claim 1, further comprising a clip configured to extend at least partially around a top portion of the vessel model when it is attached to the holder-vessel connector, the clip being removably attachable to the vessel holder.

12. The vessel holder of claim 11, wherein the clip is substantially u-shaped and has two free ends configured to be received in corresponding openings in the elongate body of the vessel holder.

13. The vessel holder of claim 11, wherein at least a portion of the clip is less rigid and/or more resilient than the elongate body of the vessel holder.

14. A method of testing an integrity of a vessel model after a simulated surgery, the method comprising:

attaching the vessel model to a vessel holder after the simulated surgery, the vessel holder comprising:

an elongate body having a pair of end walls separated by a pair of side walls defining a chamber, each end wall having:

a holder-vessel connector configured to be connected with an open end of the vessel model to attach the vessel model to the vessel holder, the holder-vessel connector defining an aperture extending through the holder-vessel connector and a respective end wall for fluidly connecting the vessel model and the vessel holder;

attaching the vessel holder to a mount by at least one holder-mount connector; and causing a fluid to flow through the aperture and into the vessel model.

15. The method of claim 14, wherein the causing the fluid to flow through the aperture comprises attaching a syringe to the end wall and pushing the fluid from the syringe to the vessel model.

16. The method of claim 14, further comprising collecting any fluid that has collected in the chamber to assess the integrity of the vessel.

17. The method of claim 14, wherein the fluid is a polymerizable material, the method further comprising:

allowing the polymerizable material to polymerize to form a mold of an inner surface of the vessel model; and removing the polymerized material for further testing.

18. The method of claim 17, wherein the further testing comprises: imaging a surface of the polymerized material.

19. The method of claim 14, further comprising, prior to causing the fluid to flow through the aperture and into the vessel model, de-airing the vessel model.

20. The method of claim 14, further comprising attaching the vessel holder to a mount before causing the fluid to flow through the aperture.

* * * * *